United States Patent
Gao et al.

(10) Patent No.: US 10,357,730 B2
(45) Date of Patent: *Jul. 23, 2019

(54) FILTER MEDIA AND ELEMENTS

(71) Applicant: DONALDSON COMPANY, INC., Minneapolis, MN (US)

(72) Inventors: Qiong Gao, Minneapolis, MN (US); Gregory S. Tronnes, Richfield, MN (US); Rakesh Kumar Yadav, Lakeville, MN (US); Michael A. Madden, Woodbury, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 414 days.

This patent is subject to a terminal disclaimer.

(21) Appl. No.: 14/776,447

(22) PCT Filed: Mar. 5, 2014

(86) PCT No.: PCT/US2014/020698
§ 371 (c)(1),
(2) Date: Sep. 14, 2015

(87) PCT Pub. No.: WO2014/149750
PCT Pub. Date: Sep. 25, 2014

(65) Prior Publication Data
US 2016/0129381 A1 May 12, 2016

Related U.S. Application Data

(60) Provisional application No. 61/788,876, filed on Mar. 15, 2013, provisional application No. 61/835,881, filed on Jun. 17, 2013.

(51) Int. Cl.
*B01D 46/20* (2006.01)
*B01D 46/16* (2006.01)
(Continued)

(52) U.S. Cl.
CPC ..... *B01D 39/2017* (2013.01); *B01D 39/1623* (2013.01); *B01D 39/2024* (2013.01);
(Continued)

(58) Field of Classification Search
CPC ............. B01D 46/521; B01D 39/1623; B01D 39/2017; B01D 39/2024; B01D 2239/65;
(Continued)

(56) References Cited

U.S. PATENT DOCUMENTS 3,341,497 A  9/1967 Sherman et al.
3,847,821 A  11/1974 Krueger
(Continued)

FOREIGN PATENT DOCUMENTS

CN  1238088 C  1/2006
CN  101352631 A  1/2009
(Continued)

OTHER PUBLICATIONS

Wilcox et al., "Technology Review of Modern Gas Turbine Inlet Filtration Systems," *International Journal of Rotating Machinery*, Dec. 18, 2011, vol. 2012, Article ID 128134; 15 pgs.
(Continued)

*Primary Examiner* — Robert Clemente
(74) *Attorney, Agent, or Firm* — Mueting, Raasch & Gebhardt, P.A.

(57) ABSTRACT

Fibrous filter medium that includes a melt-blown filter layer comprising melt-blown fibers and a high-efficiency glass-containing filter layer comprising glass fibers.

16 Claims, 8 Drawing Sheets

(51) Int. Cl.
*B01D 39/20* (2006.01)
*B01D 39/16* (2006.01)
*B01D 46/52* (2006.01)

(52) U.S. Cl.
CPC .... *B01D 46/521* (2013.01); *B01D 2239/0428* (2013.01); *B01D 2239/0435* (2013.01); *B01D 2239/065* (2013.01); *B01D 2239/0622* (2013.01); *B01D 2239/0654* (2013.01); *B01D 2239/0681* (2013.01); *B01D 2239/086* (2013.01); *B01D 2239/1233* (2013.01)

(58) Field of Classification Search
CPC .......... B01D 2239/86; B01D 2239/428; B01D 2239/435; B01D 2239/622; B01D 2239/681; B01D 2239/1233; B01D 2239/0428; B01D 2239/0435; B01D 2239/065; B01D 2239/0654; B01D 46/003; B01D 2279/60; B01D 46/002
See application file for complete search history.

(56) References Cited

U.S. PATENT DOCUMENTS

| | | | |
|---|---|---|---|
| 3,951,814 A | 4/1976 | Krueger | |
| 4,904,385 A | 2/1990 | Wessling et al. | |
| 5,306,321 A | 4/1994 | Osendorf | |
| 5,350,443 A | 9/1994 | Von Blücher et al. | |
| 5,543,047 A | 8/1996 | Stoyell et al. | |
| 5,620,785 A | 4/1997 | Watt et al. | |
| 5,766,288 A | 6/1998 | Thiele et al. | |
| 5,935,883 A | 8/1999 | Pike | |
| 5,993,501 A | 11/1999 | Cusick et al. | |
| 6,027,553 A | 2/2000 | Hirano et al. | |
| 6,110,249 A | 8/2000 | Medcalf et al. | |
| 6,161,540 A | 12/2000 | Fecteau | |
| 6,196,708 B1 | 3/2001 | Rogers | |
| 6,228,477 B1 | 5/2001 | Klare et al. | |
| 6,334,881 B1 | 1/2002 | Giannetta et al. | |
| 6,409,787 B1 | 6/2002 | Smithies et al. | |
| 6,428,610 B1 | 8/2002 | Tsai et al. | |
| 6,554,881 B1 | 8/2003 | Healey | |
| 6,607,810 B1 | 8/2003 | Boich | |
| 6,624,100 B1 | 9/2003 | Pike | |
| 6,649,547 B1 | 11/2003 | Arnold et al. | |
| 6,669,761 B2 | 12/2003 | Schultheiss et al. | |
| 6,673,136 B2 | 1/2004 | Gillingham et al. | |
| 6,706,086 B2 | 3/2004 | Emig et al. | |
| 6,716,274 B2 | 4/2004 | Gogins et al. | |
| 6,746,517 B2 | 6/2004 | Benson et al. | |
| 6,800,117 B2 | 10/2004 | Barris et al. | |
| 6,849,329 B2 | 2/2005 | Perez et al. | |
| 6,858,057 B2 | 2/2005 | Healey | |
| 6,875,256 B2 | 4/2005 | Gillingham et al. | |
| 7,063,733 B2 | 6/2006 | Mori et al. | |
| 7,097,684 B2 | 8/2006 | Choi | |
| 7,150,774 B2 | 12/2006 | Kubokawa et al. | |
| 7,157,117 B2 | 1/2007 | Mikhael et al. | |
| 7,173,104 B2 | 2/2007 | Rätzsch et al. | |
| 7,309,372 B2 | 12/2007 | Kahlbaugh et al. | |
| 7,311,880 B2 | 12/2007 | Perman et al. | |
| 7,314,497 B2 | 1/2008 | Kahlbaugh et al. | |
| 7,316,723 B2 | 1/2008 | Chung et al. | |
| 7,361,694 B2 | 4/2008 | Strandburg et al. | |
| 7,390,443 B1 | 6/2008 | Choi | |
| 7,398,887 B2 | 7/2008 | Choi | |
| 7,407,703 B2 | 8/2008 | DeYoung et al. | |
| 7,439,276 B2 | 10/2008 | Strandburg et al. | |
| 7,524,910 B2 | 4/2009 | Jiang et al. | |
| 7,632,339 B2 | 12/2009 | Singh | |
| 7,686,018 B2 | 3/2010 | Cerbini | |
| 7,812,062 B2 | 10/2010 | Strandburg et al. | |
| 7,896,941 B2 | 3/2011 | Choi | |
| 7,938,963 B2 | 5/2011 | Klein et al. | |
| 7,985,344 B2 | 7/2011 | Dema et al. | |
| 7,993,427 B2 | 8/2011 | Hassmann et al. | |
| 7,993,523 B2 | 8/2011 | Chen et al. | |
| 8,021,455 B2 | 9/2011 | Adamek et al. | |
| 8,021,457 B2 | 9/2011 | Dema et al. | |
| 8,038,013 B2 | 10/2011 | Chen et al. | |
| 8,057,567 B2 | 11/2011 | Webb et al. | |
| 8,062,523 B2 | 11/2011 | Cloud et al. | |
| 8,147,584 B2 | 4/2012 | Hassmann et al. | |
| 8,197,569 B2 * | 6/2012 | Healey | B01D 39/1623 55/486 |
| 8,206,484 B2 | 6/2012 | Claasen et al. | |
| 8,268,033 B2 | 9/2012 | Rogers et al. | |
| 8,282,712 B2 | 10/2012 | Chi et al. | |
| 8,303,693 B2 | 11/2012 | Leung | |
| 8,349,920 B2 | 1/2013 | Menning | |
| 8,361,180 B2 | 1/2013 | Lim et al. | |
| D677,370 S | 3/2013 | Handley et al. | |
| 8,410,006 B2 | 4/2013 | Chappas et al. | |
| 8,460,424 B2 | 6/2013 | Rogers et al. | |
| 8,518,142 B2 | 8/2013 | Handley et al. | |
| 8,545,607 B2 | 10/2013 | Cambo et al. | |
| 8,608,817 B2 | 12/2013 | Wertz et al. | |
| 8,950,587 B2 | 2/2015 | Thomson et al. | |
| 9,474,994 B2 * | 10/2016 | Gao | B01D 39/163 |
| 2001/0040136 A1 | 11/2001 | Wei et al. | |
| 2003/0082979 A1 | 5/2003 | Bean et al. | |
| 2005/0092451 A1 | 5/2005 | Choi et al. | |
| 2005/0132682 A1 | 6/2005 | Paul | |
| 2005/0163893 A1 | 7/2005 | Mintz | |
| 2006/0096263 A1 | 5/2006 | Kahlbaugh et al. | |
| 2006/0100317 A1 | 5/2006 | Ratzsch et al. | |
| 2006/0242933 A1 | 11/2006 | Webb et al. | |
| 2006/0292947 A1 | 12/2006 | LaVietes et al. | |
| 2007/0125700 A1 | 6/2007 | Ding et al. | |
| 2007/0262027 A1 | 11/2007 | Krogue et al. | |
| 2007/0283808 A1 * | 12/2007 | Chung | B01D 39/1623 95/285 |
| 2008/0053922 A1 | 3/2008 | Honsinger, Jr. et al. | |
| 2008/0105612 A1 | 5/2008 | Chappas | |
| 2008/0245037 A1 | 10/2008 | Rogers et al. | |
| 2008/0314010 A1 | 12/2008 | Smithies et al. | |
| 2009/0032475 A1 | 2/2009 | Ferrer et al. | |
| 2009/0071114 A1 | 3/2009 | Smithies et al. | |
| 2009/0120048 A1 | 5/2009 | Wertz et al. | |
| 2009/0120868 A1 | 5/2009 | Huppchen et al. | |
| 2009/0193773 A1 * | 8/2009 | Sundvik | B01D 46/125 55/478 |
| 2009/0266048 A1 * | 10/2009 | Schwarz | B01D 39/1692 60/39.092 |
| 2010/0000411 A1 | 1/2010 | Wertz et al. | |
| 2010/0050873 A1 * | 3/2010 | Hiner | B01D 46/0024 95/283 |
| 2010/0101199 A1 | 4/2010 | Veeser et al. | |
| 2011/0042316 A1 | 2/2011 | Chen et al. | |
| 2011/0067368 A1 | 3/2011 | Handley et al. | |
| 2011/0079553 A1 | 4/2011 | Thomson et al. | |
| 2011/0147976 A1 | 6/2011 | Wertz et al. | |
| 2011/0192799 A1 | 8/2011 | Brelsford | |
| 2011/0198280 A1 | 8/2011 | Jones et al. | |
| 2011/0209622 A1 | 9/2011 | Hiner et al. | |
| 2011/0259813 A1 | 10/2011 | Wertz et al. | |
| 2011/0315144 A1 | 12/2011 | Eitzman et al. | |
| 2012/0065333 A1 | 3/2012 | Li et al. | |
| 2012/0302120 A1 | 11/2012 | Clark et al. | |
| 2013/0001155 A1 | 1/2013 | Neubauer et al. | |
| 2013/0008313 A1 | 1/2013 | Handley et al. | |
| 2014/0260137 A1 | 9/2014 | Amsden et al. | |
| 2014/0366732 A1 | 12/2014 | Gao et al. | |
| 2015/0013295 A1 | 1/2015 | Uchiyama et al. | |

FOREIGN PATENT DOCUMENTS

| | | |
|---|---|---|
| CN | 201209927 Y | 3/2009 |
| CN | 101668576 A | 3/2010 |
| CN | 102958570 A | 3/2013 |
| EP | 818230 A1 | 1/1989 |
| EP | 338479 A1 | 10/1989 |
| JP | 3331651 B2 | 10/2002 |

(56) References Cited

FOREIGN PATENT DOCUMENTS

| | | |
|---|---|---|
| JP | 3401809 B2 | 4/2003 |
| JP | 2006281212 A | 10/2006 |
| JP | 2012255168 A | 12/2012 |
| KR | 20130034689 A | 4/2013 |
| WO | WO 98/13123 A1 | 4/1998 |
| WO | WO 2004/069378 A2 | 8/2004 |
| WO | WO 2005/108442 A1 | 11/2005 |
| WO | WO 2008/000276 A2 | 1/2008 |
| WO | WO 2008/106490 A | 9/2008 |
| WO | WO 2009/062009 A2 | 5/2009 |
| WO | WO 2009/102487 A2 | 8/2009 |
| WO | WO 2010/151580 A1 | 12/2010 |
| WO | WO 2011/100712 A1 | 8/2011 |
| WO | WO 2011/163002 A2 | 12/2011 |
| WO | WO 2012/034971 A1 | 3/2012 |
| WO | WO 2012/129094 A1 | 9/2012 |
| WO | WO 2013/025445 A2 | 2/2013 |
| WO | WO 2013/170890 A1 | 11/2013 |
| WO | WO 2014/149750 A1 | 9/2014 |

OTHER PUBLICATIONS

"Protective Materials Product Bulletin L-21484," Jan. 2011:1 page.

"Protective Material Product Bulletin PM-3633," 3M Protective Materials and Consumer Health Care Division, St. Paul, MN; Dec. 2007:4 pgs.

"Protective Material Product Bulletin PM-490," 3M Protective Materials and Consumer Health Care Division, St. Paul, MN; Jun. 2007:3 pgs.

International Search Report and Written Opinion from PCT/US2014/020698 issued by the U.S. Patent and Trademark Office dated Jun. 17, 2014; 13 pgs.

International Preliminary Report on Patentability and Written Opinion, dated Sep. 15, 2015, for International Application No. PCT/US2014/020698. 11 pages.

"OLEOPHOBOL CP-X" Material Safety Data Sheet, Huntsman International, LLC., Mar. 5, 2010; 7 pgs.

\* cited by examiner

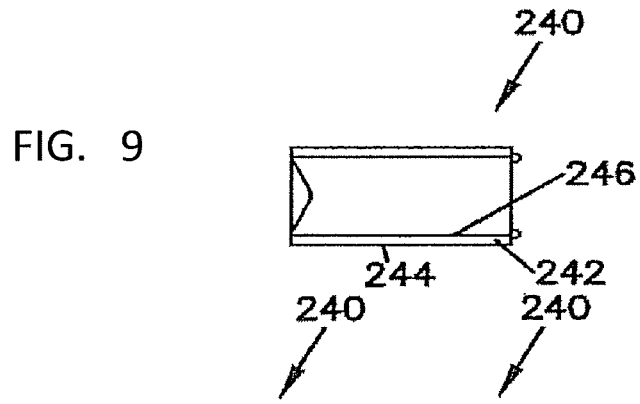
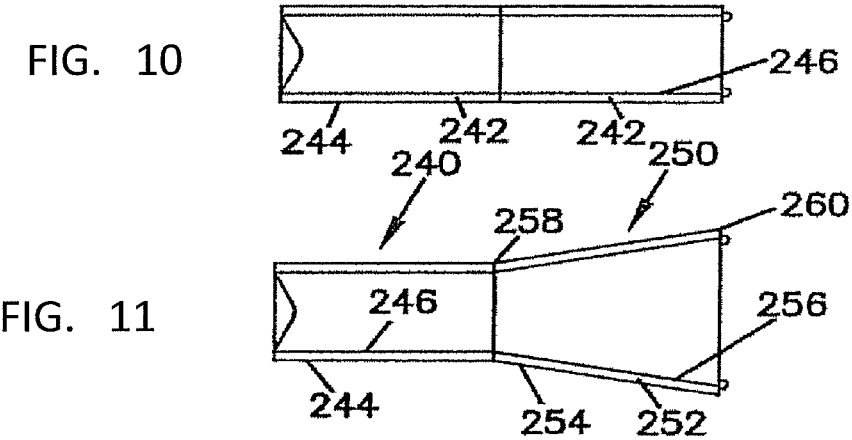
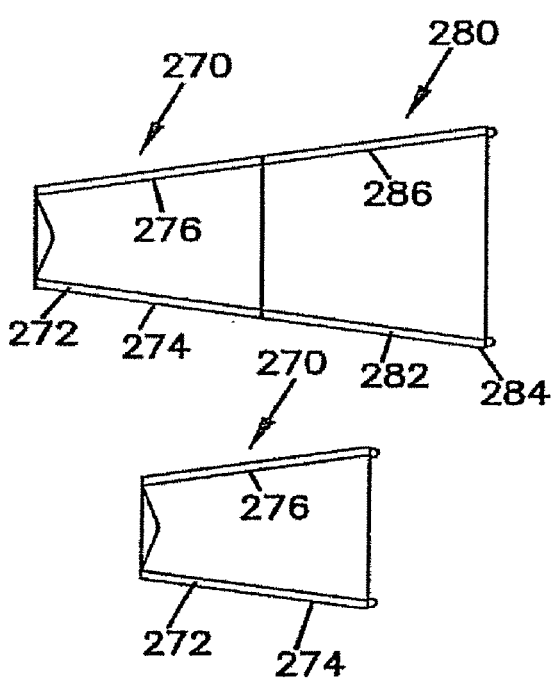

FILTER MEDIA AND ELEMENTS

CROSS-REFERENCE TO RELATED APPLICATIONS

The present application is a U.S. National Stage Application of International Application No. PCT/US2014/020698, titled FILTER MEDIA AND ELEMENTS filed on Mar. 5, 2014, which claims the benefit under 35 U.S.C. § 119(e) of U.S. Provisional Application Ser. No. 61/835,881, filed Jun. 17, 2013, and U.S. Provisional Application Ser. No. 61/788,876, filed Mar. 15, 2013, each of which are incorporated herein by reference in their entireties.

BACKGROUND

Fluid streams, particularly air and gas streams, often carry particulate material therein. The removal of some or all of the particulate material from the fluid stream is needed. For example, air intake streams to the cabins of motorized vehicles, air in computer disk drives, HVAC air, clean room ventilation air, air to engines for vehicles or power generation equipment, gas streams directed to gas turbines, and air streams to various combustion furnaces, often include particulate material therein. In the case of cabin air filters it is desirable to remove the particulate matter for comfort of the passengers and/or for aesthetics. With respect to air and gas intake streams to engines, gas turbines and combustion furnaces, it is desirable to remove the particulate material because particulate can cause substantial damage to the internal workings of the various mechanisms involved. In other instances, production gases or off-gases from industrial processes or engines may contain particulate material therein. Before such gases are discharged to the atmosphere, it is typically desirable to obtain a substantial removal of particulate material from those streams.

Higher and higher efficiency filters are needed to get cleaner air or gas streams. Low pressure is desired to have less restriction to air flow caused by high efficiency filters. Also, longer life is desired to reduce the maintenance and filter costs, which is often a challenge in high efficiency filters. Thus, there continues to be a need for high performance filters, i.e., high efficiency, low pressure-drop, long-life filters.

In certain environments where air filtration is required in highly humid environments, such as off-shore and coastal environments, conventional filter media are unsuitable. For example, such filter media may not be watertight. Thus, there continues to be a need for new filter media in such applications.

Furthermore, although the filter media and filters of the present disclosure may be used in a variety of applications, they are particularly suitable for use with gas turbine filter systems. Gas turbine systems are useful in generating electricity, and they utilize air for combustion purposes. Due to the precision moving parts in these types of systems, the combustion air needs to be clean. To ensure clean air for combustion, air filters have been used to clean the air taken into the gas turbine system. New requirements from the Power Generation industry require even cleaner air entering the turbine blades than previously required. Conventional filter media do not have sufficient performance characteristics (e.g., sufficiently high efficiency filtration while maintaining a low pressure drop) to prevent compressor blade fouling, which reduces the overall efficiency of the turbine.

SUMMARY

The present disclosure provides filter media and filter elements, particularly for air filtration applications.

In one embodiment, there is provided a filter medium that includes: a melt-blown filter layer including melt-blown fibers; and a glass-containing filter layer including glass fibers. During use, the layers are positioned relative to each other such that the melt-blown filter layer is positioned as the first layer encountered by the air stream being filtered. That is, in the filter media and filter elements of the present disclosure, the melt-blown filter layer is the most upstream layer.

In one embodiment, there is provided an air filter medium that includes: a melt-blown filter layer including melt-blown fibers; and a high-efficiency glass-containing filter layer including glass fibers and multi-component binder fibers; and an optional support layer; wherein the layers are configured and arranged for placement in an air stream.

In certain embodiments, the melt-blown fibers have an average diameter of greater than 1.5 microns, and in certain embodiments at least 2 microns. In certain embodiments, the melt-blown layer has a compressibility of greater than 40% at a pressure of 17.6 psi (i.e., 1.24 kg/cm$^2$).

In certain embodiments, the glass fibers have an average diameter of less than 2 microns, and in certain embodiments less than 1 micron. In certain embodiments, the glass-containing filter layer includes multi-component (e.g., bicomponent) binder fibers.

In certain embodiments, the filter medium includes a support layer. A support layer is typically necessary when forming a pleated filter element. In certain embodiments, the support layer includes fibers having an average diameter of at least 5 microns, and in certain embodiments at least 10 microns. In certain embodiments, the support layer has a stiffness of 100 grams or more, and in certain embodiments, 300 grams or more.

In one embodiment of the present disclosure, there is provided a filter medium that includes: a melt-blown filter layer including melt-blown fibers having an average diameter of greater than 1.5 microns; wherein the melt-blown filter layer has a compressibility of greater than 40% at a pressure of 1.24 kg/cm$^2$; a high-efficiency glass-containing filter layer including glass fibers and multi-component binder fibers; and a spunbond support layer.

In another embodiment of the present disclosure, there is provided an air filter element that includes a housing and a fibrous filter medium as described herein.

In another embodiment of the present disclosure, there is provided a method of filtering air, the method including directing the air through a filter medium or filter element as described herein.

In one embodiment, there is provided a method that involves directing the air through a filter medium that includes: a melt-blown filter layer including melt-blown fibers; a high-efficiency glass-containing filter layer including glass fibers and multi-component binder fibers; and a support layer; wherein the melt-blown filter layer is the most upstream layer.

Herein, "high-efficiency" means a filter layer, media, or element of the present disclosure is able to remove at least 70% (by number) of 0.4-micron size DEHS particles at its rated velocity. For example, a filtration efficiency of at least 70% of the most penetrating particle size (MPPS) particulates (which may be smaller than 0.4 microns) is considered "high efficiency." In certain embodiments herein, high-efficiency means removing at least 85%, at least 95%, at least 99.5%, at least 99.95%, or at least 99.995%, of such particles, at its rated velocity. In this context, "at its rated velocity" means the velocity of the air going through the media when the filter element is being operated at its rated flow rate (CFM) in its intended application, as determined by the media flow rate divided by square footage of media in the filter element.

The term "melt-blown fibers" refers to fibers formed by extruding a molten thermoplastic material through a plurality of fine, usually circular, die capillaries as molten threads or filaments into converging high velocity gas (e.g., air) streams which attenuate the filaments of molten thermoplastic material to reduce their diameter, which may be to microfiber diameter. Thereafter, the melt-blown fibers are carried by the high velocity gas stream and are deposited on a collecting surface to form a web of randomly dispersed melt-blown fibers. Typically, melt-blown fibers are microfibers which may be continuous or discontinuous, are generally equal to or smaller than 20 microns (and often 10 microns) in diameter, and are generally self bonding when deposited onto a collecting surface. Melt-blown fibers used in the present invention are preferably substantially continuous in length.

The term "spunbond fibers" refers to small diameter fibers formed by extruding molten thermoplastic material as filaments from a plurality of fine capillaries of a spinnerette having a circular or other configuration, with the diameter of the extruded filaments then being rapidly reduced. Spunbond fibers are quenched and generally not tacky when they are deposited onto a collecting surface. Spunbond fibers are generally continuous and often have average diameters larger than 7 microns, and often, 10 to 30 microns.

The term "multi-component fibers" refers to fibers formed from at least two polymers extruded separately but spun together to form one fiber. As a particular example of a multi-component fiber, a "bicomponent fiber" includes two polymers arranged in substantially constantly positioned distinct zones across the cross-section of the bicomponent fiber and extend continuously along the length of the bicomponent fiber. The configuration of such a bicomponent fiber may be, for example, a sheath/core configuration wherein one polymer is surrounded by another or may be a side-by-side configuration or an "islands-in-the-sea" configuration. For two component fibers, the polymers may be present in ratios of 75/25, 50/50, 25/75 or any other desired ratios. Conventional additives, such as pigments and surfactants, may be incorporated into one or both polymer streams, or applied to the filament surfaces.

The term "polymer" includes, but is not limited to, homopolymers, copolymers, such as for example, block, graft, random, and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

The term "electrostatic charging" refers to a process that places a charge in and/or on a dielectric material such as a polyolefin. The charge typically includes layers of positive or negative charges trapped at or near the surface of the polymer, or charge clouds stored in the bulk of the polymer. The charge may also include polarization charges which are frozen in alignment of the dipoles of the molecules. Methods of subjecting a material to an electric charge are well known by those skilled in the art. These methods include, for example, thermal, liquid-contact, electron beam, plasma, and corona discharge methods.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one."

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.). Herein, "up to" a number (e.g., up to 50) includes the number (e.g., 50).

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DRAWINGS

The disclosure may be more completely understood in connection with the following drawings.

FIGS. 9-13 are schematic cross-sectional views of further embodiments of filter elements usable in an air intake for a gas turbine system.

DETAILED DESCRIPTION OF ILLUSTRATIVE EMBODIMENTS

The present disclosure provides a filter medium that includes a melt-blown filter layer and a high-efficiency glass-containing filter layer, and an optional support layer. Such filter media can be used in a variety of filtration methods, but primarily in air filtration techniques. In particular uses, the filter media of the present disclosure are preferably used in gas turbine filter systems.

The relative orientation of the melt-blown filter layer, high-efficiency glass-containing filter layer, and optional support layer can vary depending on the use of the composite medium. Typically, the orientation can vary as long as the melt-blown filter layer is positioned as the first layer encountered by the air stream during use (i.e., the most upstream layer). In certain embodiments, a support layer is positioned between the melt-blown layer and the glass-containing layer. In certain embodiments, the glass-containing layer is positioned between the melt-blown layer and the support layer.

Each filter layer and support layer can be a composite of multiple layers. For example, the melt-blown filter layer can be a composite of two or more different layers of melt-blown fibers, either differing in composition and/or fiber diameter.

In certain embodiments, a composite filter media includes two or more melt-blown fiber layers. In certain embodiments, a composite filter media includes two or more glass-containing fiber layers. In certain embodiments, a composite filter media includes two or more support layers. These layers can be arranged in a variety of orders as long as one of the melt-blown filter layers is the most upstream layer.

Figure 1:
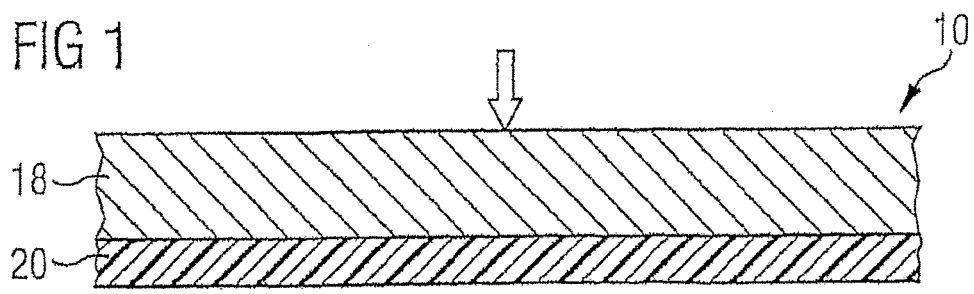
FIG. 1 is a cross sectional of an embodiment of a composite flier media of the present disclosure.

As shown in FIG. 1, which shows an exemplary composite filter medium 10 of the present disclosure, there are at least two filter layers, i.e., layers that perform filtration: a melt-blown filter layer 18 and a glass-containing filter layer 20. As shown in this exemplary embodiment, the melt-blown filter layer 18 is positioned upstream of the glass-containing filter layer 20 relative to the direction of air flow (indicated by an arrow). That is, the melt-blown filter layer 18 is the first layer encountered by the air stream during use.

Figure 2:
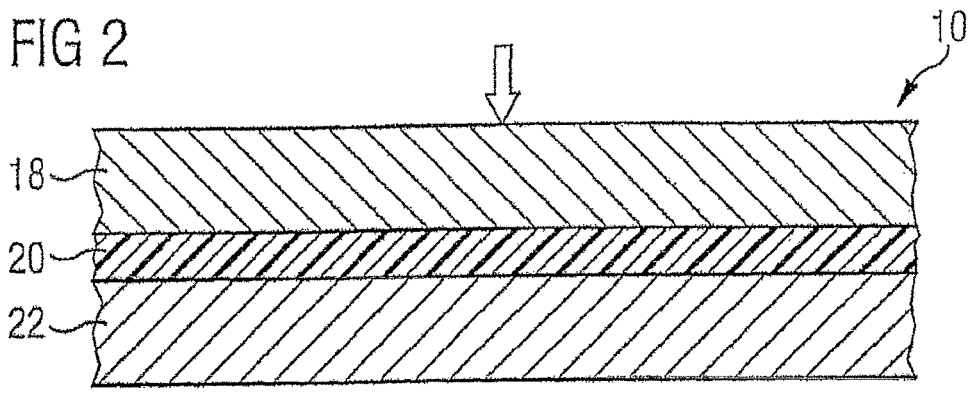
FIG. 2 is a cross sectional view of another embodiment of a composite filter media of the present disclosure.
Figure 3:
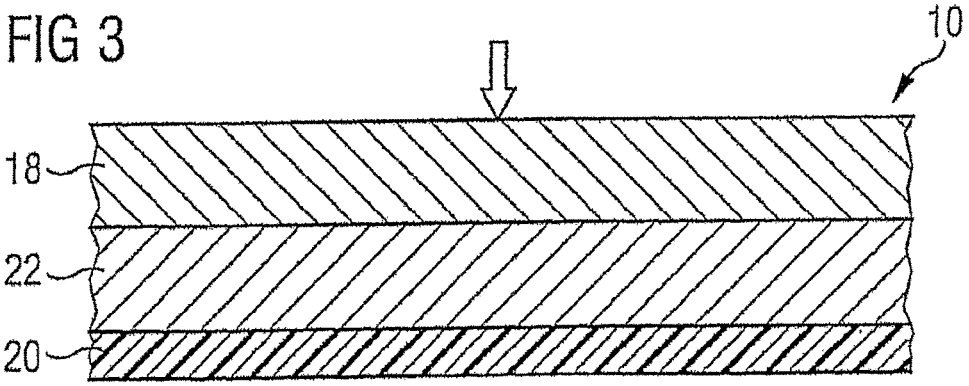
FIG. 3 is a cross sectional view of still another embodiment of a composite filter media of the present disclosure.

In certain embodiments, the composite filter media also include a support layer (i.e., substrate). This allows for the filter media to be corrugatable and/or pleatable. The support layer may be positioned either upstream or downstream of the glass-containing filter layer relative to the air flow through the filter. Shown in FIG. 2 is a filter medium (i.e., filtration medium) 10 comprising a support layer 22 disposed on the downstream side of glass-containing filter layer 20. In FIG. 3 support layer 22 is disposed on the upstream side of glass-containing filter layer 20 between melt-blown filter layer 18 and glass-containing filter layer 20.

The thicknesses of each of the filter and support layers may be the same or different. Thus, the relative sizes shown in FIGS. 1-3 are not limiting. However, it is noted that thickness has an effect on filtration properties. The overall thickness of the media is desirably minimized without significantly affecting the other media properties, such as dust loading capacity, efficiency, and permeability. This allows for more pleats in an element, for example, preferably such that a filter element includes a maximum amount of media without adversely affecting the filter element properties and performance (e.g., efficiency, pressure drop, or dust loading capacity).

In certain embodiments, a scrim can be used to create a layer downstream from the glass-containing layer to capture any glass fibers released from the glass-containing layer for preventing or reducing introduction of glass fibers into the filtered air. The filtration layer of fiber glass medium has two faces. Useful materials for the scrim (i.e., filtration layer for the glass fibers) typically have a high permeability (i.e., "perm") (e.g., greater than 1600 $l/m^2/s$) and are thin (e.g., less than 0.005 inch) so there is a minimal effect on the flat sheet or filter element performance. Examples of such scrim materials include those available under the tradenames FINON C303NW and FINON C3019 NW from Midwest Filtration in Cincinatti, Ohio. Others are described, for example, in U.S. Pat. Pub. 2009/0120868.

The layers are typically laminated together so the melt-blown layer is the furthest upstream, the spunbond is downstream from the melt-blown layer, the wet-laid glass-containing layer is just downstream of the spunbond layer, and the scrim (if present) is on the most downstream side. Alternatively, the wet-laid glass-containing layer is positioned between the melt-blown layer and the spunbond layer.

Typically, in a filter medium of the present disclosure, the filter layers, and preferably, the filter and support layers are adhered together with an adhesive, through thermal bonding or ultrasonic bonding, through the use of binder fibers, or using a combination of such techniques. Preferred methods include the use of an adhesive, binder fibers, or a combination thereof. A particularly preferred method is through the use of an adhesive (pressure sensitive adhesives, hot melt adhesives) applied in a variety of techniques, including, for example, powder coating, spray coating, or the use of a pre-formed adhesive web. Typically, the adhesive is in a continuous layer, or it can be patterned if so desired as long as the filter medium does not delaminate during processing or use. Exemplary adhesives include hot melt adhesives such as polyesters, polyamides, acrylates, or combinations thereof (blends or copolymers).

If an adhesive is used, the amount of adhesive can be readily determined by one of skill in the art. A desired level is one that provides suitable bonding between the layers without adversely impacting the air flow through the media. For example, the reduction of the Frazier permeability of a composite filter medium is preferably less than 20%, or more preferably less than 10%, of the inverse of the sum of the inverse of each layer's permeability (i.e., $(1/A_{perm}+1/B_{perm}+1/C_{perm})^{-1}$). This is also applicable for any other lamination methods.

In order to increase rigidity and provide better flow channel in an element, a filter medium can be corrugated. Thus, preferred filter media of the present disclosure should have the characteristics to survive a typical hot corrugation process without media damage (which often deteriorate the media performance). Preferred filter media should also have the ability to maintain the depth of the corrugations (e.g., 0.020-0.035 inch, 0.5 mm to 0.9 mm) through further processing, storage, transportation, and use. Typically, there should not be more than 20% reduction in corrugation depth, or not more than 30% reduction in corrugation depth, or not more than 50% reduction in corrugation depth, after the corrugations are formed (as a result of handling during further processing, storage, transportation, and use). These properties are typically related to media composition, as well as material strength and stiffness.

With or without the corrugation, a filter medium can be folded into multiple folds or pleats and then installed in a filter housing or frame. Pleating of a flat sheet or corrugated sheet can be carried out using any number of pleating techniques, including but not limited to, rotary pleating, blade pleating, and the like. The corrugated media may have any one of several pleat supporting mechanisms applied to the pleated media as described in U.S. Pat. No. 5,306,321. For example, corrugated aluminum separators, hot melt beads, and indentations (often referred to as PLEATLOC pleated media) can be used.

In certain embodiments, a fold is imprinted into the filter media in a spacer form so bonding of the folds is prevented in an effective way, even in cases if the media is moist or overloaded. These dents on the pleat tips that are vertical to the corrugation channel direction on both sides of the media, keep pleats separated, and provide better flow channels for air to flow through the pleat pack in an element. If in a conical or cylindrical type element, such as that shown in FIGS. 9-14, dents on the outside can be deeper and wider than those on the inside to keep even separation in pleats.

For a noncorrugated media, other pleat separation methods can be used on any of the media described herein, such as those involving the addition of a hot-melt adhesive bead between the pleats, or the use of comb separators. The pleated material can be formed into a cylinder or "tube" and then bonded together, such as through the use of an adhesive (e.g., a urethane-based, hot-melt adhesive, etc.), or ultrasonic welding, for example.

The filter media of the present disclosure can be incorporated into a variety of standard filter element forms, such as the WAVE filter element depicted in U.S. Design Pat. No. 677370 or described in International Pub. No. WO 2010/151580.

In certain embodiments, filter layers, composite filter media (flat or corrugated), and filter elements of the present disclosure are referred to as "high efficiency." In certain embodiments, a filter layer, composite filter medium, or filter element of the present disclosure displays a filtration efficiency of at least 70% with 0.4-micron size DEHS (di-ethyl-hexyl-sebacat) particles at its rated velocity. Preferably, the filtration efficiency is at least 85%, or at least 95%, or at least 99.5%, or at least 99.95%, or at least 99.995% of the most penetrating particle size particles (MPPS) at its rated velocity (i.e., rated flow rate in cubic feet per minute divided by square footage of media in the element).

In certain embodiments, a filter layer, composite filter medium and/or filter element of the present disclosure is watertight. As used herein, a "watertight" filter medium or element means that the medium or element will prevent bulk water or water droplets from passing through the filter medium and/or the filter element for several hours under heavy water spray conditions while being operated at the filter's rated flow rate. The watertight characteristics of the filter element can be measured using the Water Spray Test described in the Examples. The watertight characteristics of the media can be measured by the hydrostatic head test described in the Examples. In certain embodiments, a filter medium and/or element of the present disclosure displays a hydrostatic head of at least 10 inches (25.4 cm) of water, or at least 15 inches (38.1 cm) of water, or at least 20 inches (50.8 cm) of water.

In certain embodiments, a filter layer and/or composite filter medium of the present disclosure has good depth loading characteristics.

In certain embodiments, a filter layer, composite filter medium (which may or may not be corrugated) and/or filter element of the present disclosure displays a salt loading capacity of at least 10 grams per square meter ($g/m^2$) at a terminal pressure drop of 4 inches water column (i.e., 1000 Pa). Typically, the higher salt loading capacity the better, as this is an indicator of life of the product.

In certain embodiments, a filter layer, composite filter medium (which may or may not be corrugated) and/or filter element of the present disclosure displays a dust loading capacity of at least 30 grams per square foot ($g/ft^2$) of ASHRAE dust (per ASHRAE 52.2-2007 or EN779:2012) when loaded to 4 inches of water (i.e., 1000 Pa) dP (pressure drop) in static mode (as opposed to pulsing mode). Typically, the higher dust loading capacity the better, as this is an indicator of life of the product.

In certain embodiments, a composite filter medium (which may or may not be corrugated) and/or filter element (which is typically corrugated and pleated) of the present disclosure displays an efficiency of at least F9 per EN779:2012.

In certain embodiments, composite filter medium (which may or may not be corrugated) and/or a filter element (which is typically corrugated and pleated) of the present disclosure displays an efficiency of at least E10, or at least E11, or at least E12 per EN1822:2009.

In certain embodiments, a filter layer and/or composite filter medium has a relatively low solidity. As used herein, solidity is the solid fiber volume divided by the total volume of the filter medium at issue, usually expressed as a percentage, or put another way, the volume fraction of media occupied by the fibers as a ratio of the fibers volume per unit mass divided by the media's volume per unit mass. A suitable test for determining solidity is, for example, as follows. Solidity can be measured by performing a solvent extraction of resin from the medium to determine resin density. The percent resin, density of media (calculated from basis weight and thickness), density of the resin, and density of the fibers is used. TGA can be used to determine relative quantities of the materials in the medium. Literature values for densities of fiber components can also be used, and the value analyzed using the following equation:

$$\text{Solidity \%} = \cfrac{100}{\cfrac{1}{\rho_{media}}\Bigg/\left(\cfrac{\text{Binder \%}}{100}\bigg/\rho_{binder} + \cfrac{100-\text{Binder \%}}{100}\bigg/\rho_{fiber}\right)}$$

Typically, a solidity of less than 20 percent (%) at a pressure of 1.5 psi (i.e., 0.1 kg/cm$^2$), or often less than 15%, is desirable.

In certain embodiments, a filter layer and/or composite filter medium has a relatively high compressibility. Compressibility can be measured by comparing two thickness measurements using a dial comparator, with compressibility being the relative loss of thickness from a 2 ounce (56.7 g) to a 9 ounce (255.2 g) total weight (0.125 psi-0.563 psi or 8.6 millibars-38.8 millibars), as described in U.S. Pat. No. 8,460,424. Another suitable test for determining compressibility is described in International Publication No. WO 2013/025445. Typically, a compressibility of greater than 40 percent at a pressure of 17.6 pounds per square inch (psi) (i.e., 1.24 kg/cm$^2$) is desirable.

In certain embodiments, a filter layer and/or composite filter medium of the present disclosure demonstrates high strength and high flexibility. This can be demonstrated by a relatively low loss in tensile strength after a layer and/or a composite medium has been folded or corrugated. Less than 20% loss of tensile strength after folding or corrugation of a filter layer or filter medium is desirable.

In a preferred embodiment, a filter medium of the present disclosure is used in a gas turbine air-intake filtration system. Accordingly, the composite filter media is mounted into a frame so as to create an air-tight fit between the filter media and the frame, wherein the filter media is positioned such that at least one melt-blown filter layer is disposed on an upstream side of the filter medium relative to a direction of air flow through the filter.

Melt-Blown Filter Layer

Typically, melt-blowing is a nonwoven web forming process that extrudes and draws molten polymer resins with heated, high velocity air to form fine filaments. The filaments are cooled and collected as a web onto a moving screen. The process is similar to the spun-bond process, but melt-blown fibers are typically much finer. Typically, the melt-blown fibers have an average diameter of no greater than 20 microns. In certain embodiments, the melt-blown filter layer includes melt-blown fibers having an average diameter of greater than 1.5 microns. In certain embodiments, the melt-blown filter layer includes melt-blown fibers having an average diameter of at least 2 microns. In certain embodiments, the melt-blown fibers have an average diameter of 2-3 microns.

In certain embodiments, the melt-blown filter layer has a relatively high compressibility. In certain embodiments, a melt-blown filter layer of a filter medium of the present disclosure has a compressibility of greater than 40 percent at a pressure of 17.6 pounds per square inch (psi) (i.e., 1.24 kg/cm$^2$). In certain embodiments, a melt-blown filter layer of a filter medium of the present disclosure has a compressibility of up to 90 percent at a pressure of 17.6 pounds per square inch (psi) (i.e., 1.24 kg/cm$^2$).

In certain embodiments, scaffold fibers as described in International Publication No. WO 2013/025445 can be included in the melt-blown filter layer if desired for enhancing performance. However, media with high levels of compressibility have little or no scaffold fibers used as described in International Publication No. WO 2013/025445 in the melt-blown filter layer. The scaffold fibers provide support for the media fiber, and add improved handling, greater tensile strength, and results in lower compressibility to the media.

In certain embodiments, the melt-blown filter layer is electrostatically charged. This is typically done to enhance particle capture efficiency. The charge may be induced triboelectrically or by applying a high voltage charge. The former is a result of rubbing the fibers against a grounded, conductive surface, or rubbing two different fibers against each other (one is more electropositive and the other is more electronegative). Alternatively, electrostatic charging can be carried out using, for example, corona discharge or plasma discharge methods. Such methods are known to one of skill in the art. The extent of electrostatic charging done herein is what is conventionally done with melt-blown fibers.

In certain embodiments, the melt-blown filter layer includes a continuously gradient structure of larger fibers and more open structure at a first major surface and smaller fibers and less open structure at a second major surface. In certain embodiments of this construction, the second major surface of the melt-blown filter layer is adjacent the support layer and the first major surface is positioned as the most upstream surface (i.e., the first layer encountered by the air stream during use).

In certain embodiments, the melt-blown filter layer includes a composite of multiple layers of melt-blown fibers with larger fibers and more open structure at a first major surface of the melt-blown composite and smaller fibers and less open structure at a second major surface of the melt-blown composite. In certain embodiments of this construction, the second major surface of the melt-blown filter layer is adjacent the support layer and the first major surface is positioned as the most upstream surface (i.e., the first layer encountered by the air stream during use).

In certain embodiments, the melt-blown filter layer has a basis weight of up to 50 grams/meter$^2$ (g/m$^2$ or "gsm"), and often up to 100 gsm. In certain embodiments, the melt-blown filter layer has a basis weight of at least 5 grams/meter$^2$ (g/m$^2$ or "gsm"), and often at least 10 gsm.

The melt-blown filter layer is typically considered a depth filtration layer. As such, dirt is captured throughout the thickness of the melt-blown filter layer (i.e., in the "z" direction) as opposed to on the surface of a surface loading filter media.

In certain embodiments, the melt-blown filter layer is at least 0.005 inch (125 microns) thick, and often at least 0.01 inch (250 microns) thick. In certain embodiments, the melt-blown filter layer is up to 0.02 inch (500 microns) thick.

In certain embodiments, the melt-blown filter layer has a Frazier permeability (differential pressure set at 0.5 inch of water) of at least 20 liters/meters squared-second (l/m$^2$/sec), or at least 80 l/m$^2$-sec, or at least 200 l/m$^2$-sec when evaluated separately from the remainder of the construction. In certain embodiments, the melt-blown filter layer has a Frazier permeability (differential pressure set at 0.5 inch of water) of up to 1000 l/m$^2$-sec, or up to 600 l/m$^2$-sec, when evaluated separately from the remainder of the construction.

In certain embodiments, the electrostatically charged melt-blown filter layer of the filter media of the present disclosure is a high-efficiency filter layer. In certain embodiments, an electrostatically charged melt-blown filter layer displays a filtration efficiency of at least 50% with 0.4-micron size DEHS (di-ethyl-hexyl-sebacat) particles at its rated velocity. Preferably, the filtration efficiency is at least 65%, or at least 85%, or at least 95%, or at least 99.5%, or at least 99.95% of 0.4-micron size or the most penetrating particle size particles. In certain embodiments, if not electrostatically charged, a melt-blown filter layer displays a filtration efficiency of at least 10% with 0.4-micron size DEHS (di-ethyl-hexyl-sebacat) particles at its rated velocity.

The melt-blown fibers can be prepared from a variety of polymers that are suitable for being melt blown. Examples include polyolefins (particularly polypropylene), ethylene-chloro-trifluoro-ethylene, other hydrophobic polymers, or non-hydrophobic polymers (e.g., polybutylene terephthalate, polystyrene, polylactic acid, polycarbonate, nylon, polyphenylene sulfide) with a hydrophobic coating or additive, or combinations thereof (e.g., blends or copolymers). Preferred polymers are polyolefins such as polypropylene, polyethylene, and polybutylene. Particularly preferred melt-blown fibers are made from polypropylene to enhance the watertight characteristics of a preferred filter medium of the present disclosure.

In certain embodiments, the melt-blown layer is hydrophobic. By this it is meant that the layer demonstrates a contact angle greater than 90 degrees with water. The fibrous material of which it is made can be hydrophobic (e.g., a polyolefin) or include a hydrophobic additive, or it can be coated with a hydrophobic material, such as the ones described herein for the hydrophobic coating on the glass-containing layer, or it can be treated with a plasma treatment technique.

Glass-Containing Filter Layer

In certain embodiments, the glass-containing filter layer includes glass fibers having an average diameter of less than 2 micron, and in certain embodiments less than 1 micron. In certain embodiments, the glass fibers have an average diameter of at least 0.01 micron, in certain embodiments at least 0.1 micron.

The glass-containing filter layer may also include fibers other than the glass-containing fibers. For example, it may contain multi-component fibers, typically bicomponent fibers, that function as binder fibers. A preferred example is bicomponent binder fibers that are core-sheath fibers having a low melting point polyester sheath and a higher melting point polyester core. The bicomponent fibers typically have fiber diameters of at least 10 microns.

The glass-containing filter layer may also include polyester fibers other than the multi-component fibers. Preferred glass-containing filter layers of the present disclosure include only glass fibers and bicomponent binder fibers.

Such fibers may be made by a variety of processes. In certain embodiments, the glass-containing filter layer is created using a wet-laid process.

Although the binder fibers in the glass-containing filter layer are used to avoid the use of any binder resin, such resin can be added to further improve its strength. Examples of suitable binder resins include solvent-based or water-based-latex resins, water-based styrene acrylics, solvent-based phenolics, and solvent-based non-phenolics, such as that available under the tradename HYCAR 26138 from Lubrizol of Cleveland, Ohio. Typically, if used, a binder resin could be present in the glass-containing layer in an amount of up to 1 wt-%, up to 5 wt-%, or up to 10 wt-%, based on the total weight of the glass-containing filter layer. Preferably, no binder resin is used in the glass-containing layer (or in any of the layers of the filter media).

Examples of suitable glass-containing filter layers include those described in U.S. Pat. Nos. 7,309,372, 7,314,497, 7,985,344, 8,057,567, and 8,268,033, and U.S. Publication Nos. 2006/0242933 and 2008/0245037.

In certain embodiments, the glass-containing filter layer has a relatively low compressibility. Typically, a glass-containing filter layer has a compressibility of less than 40 percent at a pressure of 17.6 pounds per square inch (psi) (i.e., 1.24 kg/cm$^2$). In certain embodiments, a glass-containing filter layer of the present disclosure has a compressibility of at least 20 percent at a pressure of 17 psi (i.e., 1.24 kg/cm$^2$).

In certain embodiments, the glass-containing filter layer has a relatively low solidity. Typically, a glass-containing filter layer has a solidity of less than 20 percent (%) at a pressure of 1.5 psi (i.e., 0.1 kg/cm$^2$), often less than 15%. In certain embodiments, a glass-containing filter layer of the present disclosure has a solidity of at least 5 percent at a pressure of 1.5 psi (i.e., 0.1 kg/cm$^2$).

In certain embodiments, the glass-containing filter layer has a basis weight of up to 70 grams/meter$^2$ (g/m$^2$ or "gsm"), and often up to 100 gsm. In certain embodiments, the glass-containing filter layer has a basis weight of at least 20 grams/meter$^2$ (g/m$^2$ or "gsm"), and often at least 30 gsm.

The glass-containing filter layer is considered a depth filtration layer. As such, dirt is captured throughout the thickness of the melt-blown filter layer (i.e., in the "z" direction) as opposed to on the surface of a surface loading filter media. The salt loading capacity of the glass-containing filter layer is at least 10 grams/m$^2$ at rated flow to 3 inches of water (750 Pa) terminal pressure drop.

In certain embodiments, the glass-containing filter layer is at least 0.005 inch (125 microns) thick. In certain embodiments, the glass-containing filter layer is up to 0.02 inch (500 microns) thick.

In certain embodiments, the glass-containing filter layer has a Frazier permeability (differential pressure set at 0.5 inch of water) of at least 8 l/m$^2$/sec, or at least 20 l/m$^2$/sec, or at least 40 l/m$^2$/sec, when evaluated separately from the remainder of the construction. In certain embodiments, the glass-containing filter layer has a Frazier permeability (differential pressure set at 0.5 inch of water) of up to 400 l/m$^2$-sec, or up to 200 l/m$^2$/sec, when evaluated separately from the remainder of the construction.

In certain embodiments, and glass-containing filter layer of the filter media of the present disclosure is a high-efficiency filter layer. In certain embodiments, a glass-containing filter layer displays a filtration efficiency of at least 70% with 0.4-micron size DEHS (di-ethyl-hexyl-sebacat) particles at its rated velocity. Preferably, the filtration efficiency is at least 85%, or at least 95%, or at least 99.5%, or at least 99.95%, or at least 99.995% of the most penetrating particle size (MPPS) particles at its rated velocity.

In certain embodiments, to enhance watertight characteristics, the glass-containing layer is coated with a hydrophobic coating. Such hydrophobic coating includes a material that has little or no affinity for water, or completely repels water, and thereby prevents or restricts water from passing through the filter media. Typically, the hydrophobic coating demonstrates a contact angle greater than 90 degrees when tested with water. Examples of materials suitable for forming a hydrophobic coating on the glass-containing layer include fluorochemicals, particularly fluoropolymers as described in U.S. Pat. No. 6,196,708.

Examples of useful fluoropolymers include those having a fluoroalkyl portion or, preferably, a perfluoroalkyl portion. These fluoropolymers include, for example, fluoroalkyl esters, fluoroalkyl ethers, fluoroalkyl amides, and fluoroalkyl urethanes. Often, the fluoroalkyl and/or perfluoroalkyl portion extends from a backbone of the polymer.

The fluoropolymers may include a variety of monomer units. Exemplary monomer units include, for example, fluoroalkyl acrylates, fluoroalkyl methacrylates, fluoroalkyl aryl urethanes, fluoroalkyl allyl urethanes, fluoroalkyl maleic acid esters, fluoroalkyl urethane acrylates, fluoroalkyl amides, fluoroalkyl sulfonamide acrylates, and the like. The fluoropolymers may optionally have additional non-fluoro monomer units including, for example, unsaturated hydrocarbons (e.g., olefins), acrylates, and methacrylates. Additional examples of suitable fluoropolymers are provided in U.S. Pat. No. 3,341,497.

Commercially available fluoropolymers include those available under the trade designation OLEOPHOBOL CPX from Huntsman (Charlotte, N.C.), as well as 3M Protective Material PM-490 (a nonionic fluorochemical resin), 3M Protective Material PM-3633 (a fluoropolymer emulsion), 3M L-21484 (a fluorinated amino salt derivative that can be diluted in water or polar organic solvents), all of which are available from 3M Co. (St. Paul, Minn.).

Other exemplary, commercially available, fluoropolymers are provided in aqueous emulsions. The fluoropolymers can be extracted from the aqueous emulsion by removal of the water carrier. The fluoropolymers can then be solvated in an organic solvent. To facilitate the solvation of the fluoropolymer, a compound, such as acetone, can be optionally added to the aqueous emulsion to break the emulsion. In addition, the particles of fluoropolymer can be optionally ground, subsequent to removal of water to make solvation easier and quicker.

Methods of coating such material on the glass-containing layer are conventional and well known to those skilled in the art. A typical coating weight is at least 0.5 wt-% and often no more than 3 wt-%.

Alternative to a hydrophobic coating, the glass-containing filter layer can be treated with a plasma treatment method to render it hydrophobic.

Support Layer

Filter media of the present disclosure may include a support layer. The support layer can be of any of a variety of porous materials, including fibrous materials, metal mesh, etc. Typically, fibrous materials used for the support layer are made of natural fiber and/or synthetic fibers.

In certain embodiments, the support layer includes fibers having an average diameter of at least 5 microns, or at least 10 microns. In certain embodiments, the support layer can include fibers having an average diameter of up to 250 microns.

In certain embodiments, the support layer has a basis weight of at least 50 grams/meter$^2$ (g/m$^2$ or "gsm"), and often at least 100 gsm. In certain embodiments, the support layer has a basis weight of up to 150 grams/meter$^2$ (g/m$^2$ or "gsm"), and often up to 260 gsm.

In certain embodiments, the support layer is at least 0.005 inch (125 microns) thick, and often at least 0.01 inch (250 microns) thick. In certain embodiments, the support layer is up to 0.03 inch (750 microns) thick.

In certain embodiments, the support layer has a Frazier permeability (differential pressure set at 0.5 inch of water) of at least 200 l/m$^2$-sec, when evaluated separately from the remainder of the construction. In certain embodiments, the support layer has a Frazier permeability (differential pressure set at 0.5 inch of water) of up to 8000 l/m$^2$-sec, when evaluated separately from the remainder of the construction.

In certain embodiments, the support layer has a Gurley stiffness of at least 100 grams, and often at least 300 grams.

In certain embodiments, the support layer can have a Gurley stiffness of up to 10,000 grams. A method for measuring Gurley stiffness is described in TAPPI No. T543.

Examples of suitable material for the support layer (i.e., substrate) include spunbond, wetlaid, carded, or melt-blown nonwoven. Suitable fibers can be cellulosic fiber, glass fibers, metal fibers, or synthetic polymeric fibers or the combination. Fibers can be in the form of wovens or nonwovens. Plastic or metal screen-like materials both extruded and hole punched, are other examples of filter substrates. Examples of synthetic nonwovens include polyester nonwovens, nylon nonwovens, polyolefin (e.g., polypropylene) nonwovens, polycarbonate nonwovens, or blended or multicomponent nonwovens thereof. Sheet-like substrates (e.g., cellulosic, synthetic, and/or glass or combination webs) are typical examples of filter substrates. Other preferred examples of suitable substrates include polyester or bicomponent polyester fibers (as described herein for the glass-containing layer) or polypropylene/ polyethylene terephthalate, or polyethylene/polyethylene terephthalate bicomponent fibers in a spunbond.

In certain embodiments, the support layer is a spunbond made of 100% polyester as pattern bonded continuous fiber with a high strength to weight ratio, sold under the tradename FINON and available from Kolon industries.

In certain embodiments, the support layer is hydrophobic. The fibrous material of which it is made can be hydrophobic (e.g., a polyolefin) or include a hydrophobic additive, or it can be coated with a hydrophobic material, such as the ones described herein for the hydrophobic coating on the glass-containing layer, or it can be treated with a plasma treatment technique. Alternatively, if wet-laid, a hydrophobic resin can be applied during the wet-laid process.

Filter Elements and Uses

The filter media of the present disclosure can then be manufactured into filter elements (i.e., filtration elements), including, e.g., flat-panel filters, cartridge filters, or other filtration components. Examples of such filter elements are described in U.S. Pat. Nos. 6,746,517; 6,673,136; 6,800,117; 6,875,256; 6,716,274; and 7,316,723.

The filter media can be corrugated. Exemplary corrugations are at a depth of 0.020 to 0.035 inch (0.5 mm to 0.9 mm). Corrugated filter media can then typically be pleated to form a pleat pack, then placed and sealed into a housing, as is known in the art.

Filter elements of the present disclosure can be used in industrial filtration such as in dust collectors, and in commercial and residential HVAC systems. Filter elements of the present disclosure are particularly useful in a gas turbine air intake system. Sue filtration systems are described in M. Wilcox et al., "Technology Review of Modetn Gas Turbine Inlet Filtration Systems," International Journal of Rotating Machinery, Volume 2012, Article ID 128134. An exemplary system is depicted in U.S. Patent Publication No. 2013/0008313. Filter elements of the present disclosure can also be used in filter systems commonly used today that are highly complex and of multi-stage or "cascade" type.

FIGS. 4-14 depict various embodiments of filter elements of the present disclosure that are usable in gas turbine air intake systems.

A gas turbine system uses large amount of air, so the quality of air into the system is important for the operation, performance, and life of the gas turbine. An inlet air filtration system is important to keep the air clean going into the gas turbine. Contaminated intake air can cause erosion, fouling, corrosion, and cooling air passage plugging. The filtration systems need to not only take out dry particulates, it also need to stop liquid particles and to prevent delinquent salt getting through when the moisture is high, or in other wet environments. So a high efficiency and watertight filter element is desired for modern gas turbine systems.

Figure 4:
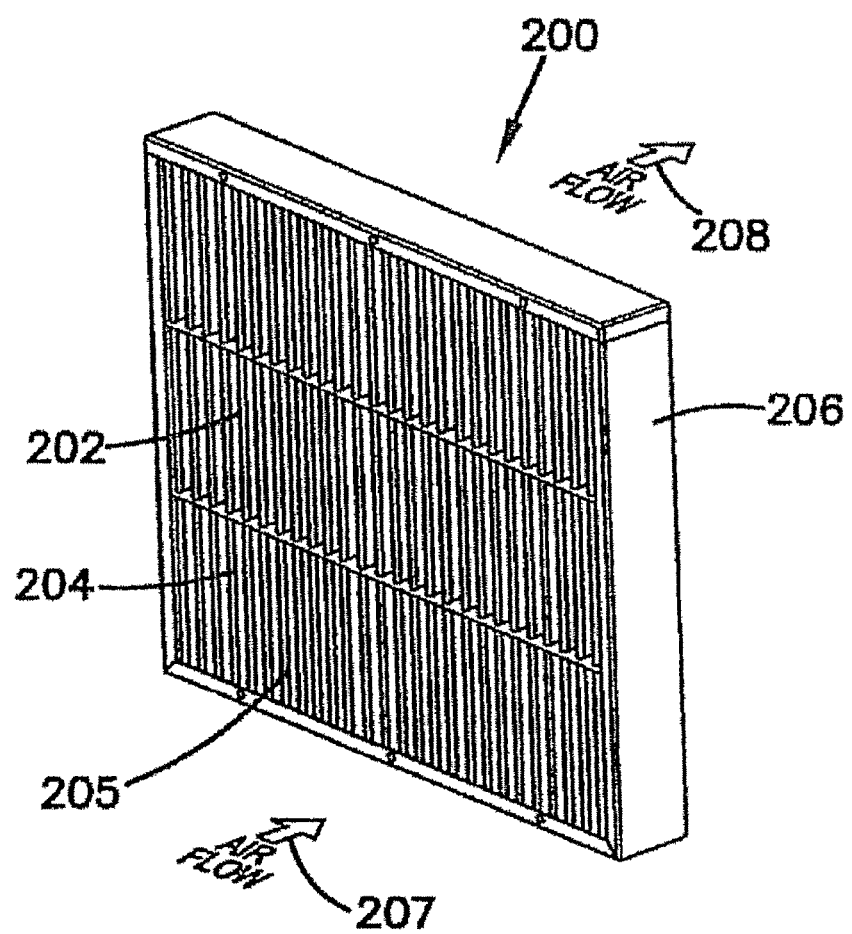
FIG. 4 is a perspective view of one embodiment of a filter element usable in an air intake system.

In FIG. 4, a pleated panel element 200 is shown in perspective view. The panel element 200 includes a media pack 202 of pleated media 204. The pleated media 204 can comprise the filter medium described herein (e.g., a melt-blown layer and a glass-containing layer). In the embodiment shown, the media pack 202 is held within a frame 206, with the examples shown being a rectangular frame 206. The frame 206 typically will include a gasket (not shown) for permitting the element 200 to be sealed against a tube sheet in the intake system. In FIG. 4, the upstream side of the pleated media 204 with the melt-blown layer is shown at 205 on the same side as the incoming air shown at arrow 207. The cleaned air is shown at arrow 208, and emerges from the media 204 from a downstream side of the media.

Figure 5:
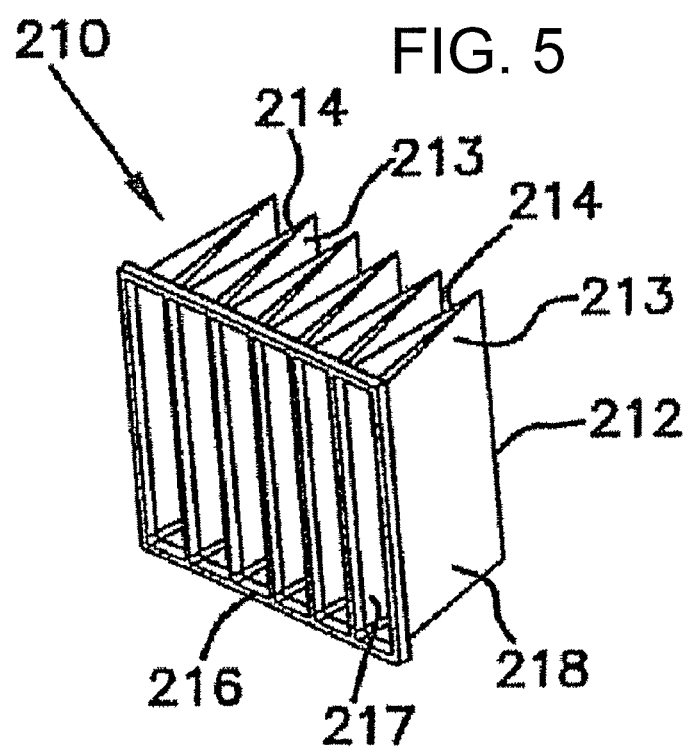
FIG. 5 is a perspective view of another embodiment of another element with a filter medium of the disclosure.

FIG. 5 depicts a perspective view of pocket filter element 210. The pocket element 210 includes a layer of filter media 212 that can comprise a filter medium of the present disclosure. In the embodiment shown, the pocket element 210 includes a plurality of panel pairs 213, 214, with each panel pair 213, 214 forming a V-like shape. The filter media 212 is secured to a frame 216. The frame 216 typically will carry a gasket for allowing the pocket element 210 to be sealed against a tube sheet, such as tube sheet 38. In such an arrangement, the media 212 has an upstream melt-blown side 217, which is inside of the V's, and a downstream side 218, which is on the outside of the V's.

Figure 6:
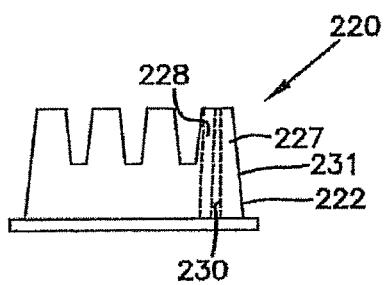
FIG. 6 is a top plan view of another filter element of the disclosure usable in an air intake.
Figure 7:
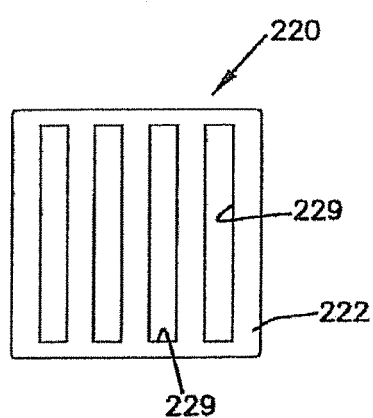
FIG. 7 is a front elevational view of the element of FIG. 6.
Figure 8:
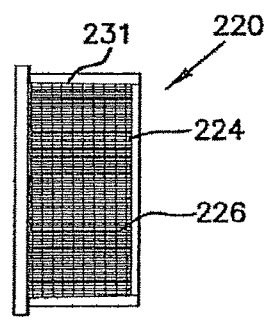
FIG. 8 is a right side devotional view of the filter element of FIG. 7.

FIGS. 6-8 depict views of a mini-pleat or multi-V style element 220. The element 220 includes a frame 222 holding a filter media pack 224 (FIG. 8). The media pack 224 comprises a plurality of mini-pleats. The mini-pleats are arranged in a panel 226, and the element 220 includes a plurality of mini-pleated panel pairs 227, 228 (FIG. 6) of the media of the invention, each forming a V-like shape. In FIG. 6, the panel pairs 227, 228 are shown in hidden lines, since the top portion of the frame 222 obstructs the view of the panel pairs 227, 228. The frame 222 defines a plurality of dirty air inlets 229 (FIG. 7), which leads to the inside part of each V of each pleated panel pair 227, 228. Each pleated panel pair 227, 228 includes an upstream side 230, which is on the inside of the V, and a downstream side 231, which is on the outside of the V.

FIGS. 9-14 show various embodiments of tubular, pleated filter elements. FIG. 9 shows a cylindrical pleated element 240 having a media pack 242 that can include a filter medium of the present disclosure with an upstream side 244 and a downstream side 246, The downstream side 246 is inside of the interior volume of the element 240.

FIG. 10 depicts two of the cylindrical elements 240 axially aligned, such that they are stacked end to end.

In FIG. 11, cylindrical element 240 is axially aligned with a partially conical element 250. The partially conical element 250 is a tubular element having a media pack 252 that can include a filter medium of the present disclosure. The element has an upstream side 254 and a downstream side 256. The conical element 250 has a first end 258 having a diameter that matches the diameter of the cylindrical element 240. The conical element 250 includes a second end 260 having a diameter that is larger than the diameter of the first end 258, thus forming the partial cone.

FIG. 12 depicts two partially conical elements 270, 280 arranged axially, and engaged end to end. Each of the elements 270 includes a media pack 272, 282 forming a tube that can include a filter medium of the present disclosure. The media packs 272, 282 each have an upstream side 274, 284 and a downstream side 276, 286.

FIG. 13 shows a single conical element 270. The element 270 can be used alone installed in the intake system for a as turbine without being installed in element pairs, as shown in FIGS. 11 and 12.

Figure 14:
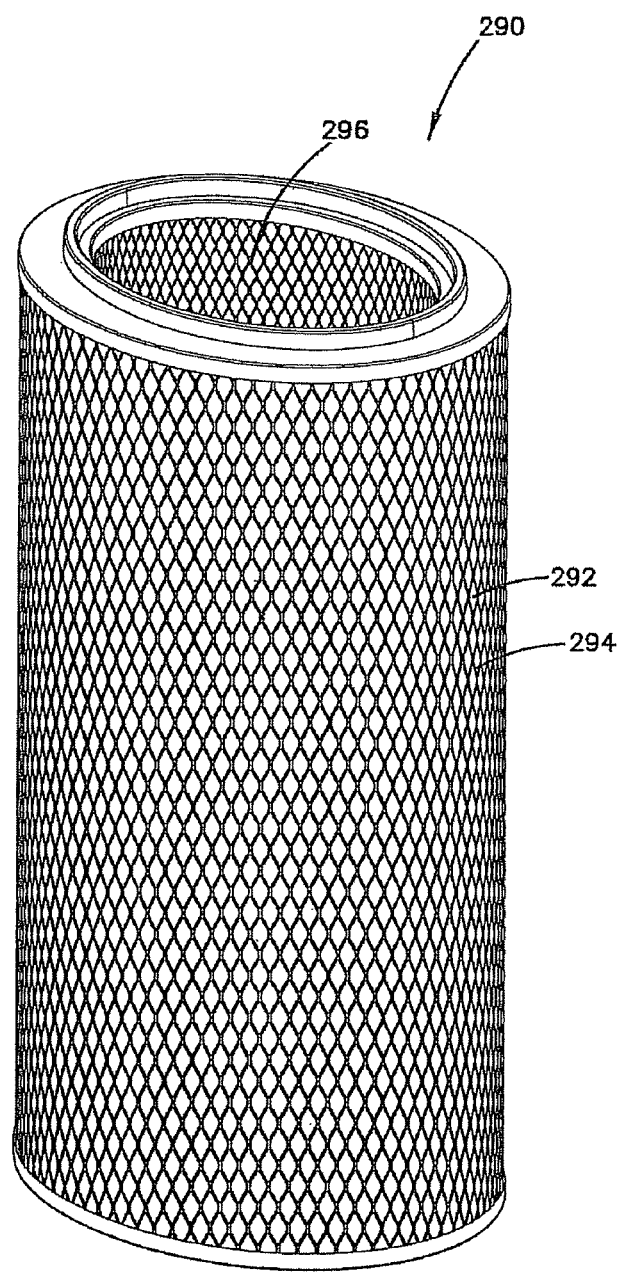
FIG. 14 is a perspective view of another embodiment of a filter element usable in an air intake for a gas turbine system.

FIG. 14 is another embodiment of a filter element 290 having media pack 292 that can include a filter medium of the present disclosure. The media pack 292 is pleated and forms a tubular shape. In this embodiment, the tubular shape is an oval shape, and in one example embodiment, a ratio of the short axis compared to the long axis of the oval is about 0.7-0.9. The media 292 includes an upstream side 294 and a downstream side 296.

It should be understood that each of the filter elements characterized above and depicted in FIGS. 4-14 can be flat media or corrugated media and/or operably installed in an intake system for a gas turbine or other ventilation system.

In operation, air to be filtered will be directed through the upstream side, typically the melt-blown layer and then through the downstream side of filter media in the respective filter element typically installed in a tube sheet. The filter media will remove at least some of the particulate from the air stream. After passing through the downstream side of the media, the filtered air is then directed to the gas turbine.

FIGS. 15-18 exemplify a filtration system for a gas turbine or compressor air intake that can include filter media and elements of the present disclosure. The system includes a hood arrangement; a louver arrangement, downstream of the hood arrangement; a coalescer arrangement, downstream of the louver arrangement; and a final stage including an arrangement of water-tight filters downstream of the coalescer arrangement. The system is free of water removal stages downstream of the final stage. In one aspect, the coalescer arrangement includes a plurality of panel filter elements. In one aspect, the plurality of panel filter elements is angled relative to each other in a zig-zag pattern. In one aspect, the panel filter element is comprised of mesh. In certain embodiments, the mesh is metal. In one aspect, the panel filter elements comprise depth loading filter media. In one aspect, the panel filter elements comprise pleated filter media. In one aspect, the panel filter elements could be watertight. In one aspect, the watertight filters are pleated. In one aspect, the watertight filters form a wave or other shape. In one aspect, the watertight filters are mounted relative to a horizontal at a slope of 1-25 degrees to slope in a downward direction upstream.

With respect to the embodiments exemplified in FIGS. 15-18, in another aspect, a method for filtering air through a system for a gas turbine is provided. The method includes directing air to be filtered into a hood arrangement; from the hood arrangement, directing the air into a louver arrangement; from the louver arrangement, directing the air into a coalescer arrangement; and from the coalescer arrangement, directing the air into a final stage including arrangement of watertight filters and/or any form of static filters. The system is free of water removal stages downstream of the final stage. In one aspect, the method of directing air to be filtered into a hood arrangement includes directing air having a velocity of no greater than 4.5 meters per second (m/s) through the hood arrangement at a pressure drop less than 100 Pa. In another aspect, the step of directing air into a louver arrangement includes directing air having a velocity of no greater than 5.6 m/s through the hood arrangement at a pressure drop less than 60 Pa.

In another aspect, the step of directing air into a coalescer arrangement includes directing air having a media velocity of no greater than 3.0 m/s through the coalescer arrangement at a pressure drop less than 175 Pa. In another aspect, the step of directing air into an arrangement of watertight filters includes directing air having a media velocity of no greater than 0.2 m/s through the arrangement of watertight filters at a pressure drop less than 375 Pa. In another aspect, the method includes during the step of directing air into an arrangement of watertight filters, allowing liquid to drain by gravity from the watertight filters on an upstream side of the watertight filters.

Figure 15:
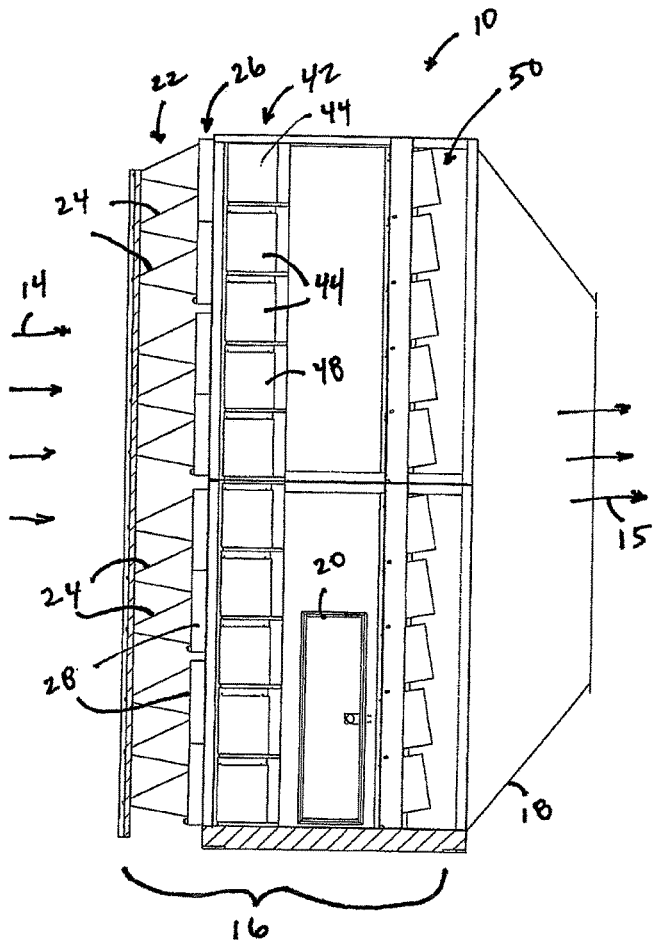
FIG. 15 is a schematic, side view of one embodiment of a filtration system for a gas turbine air intake, constructed in accordance with principles of this disclosure.
Figure 16:
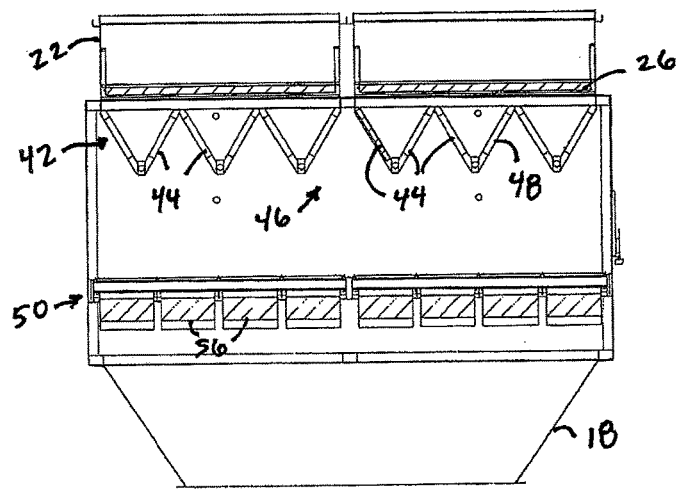
FIG. 16 is a top view of the system of FIG. 15.

More specifically, with reference to FIG. 15, a filtration system 10 for a gas turbine or compressor air intake is provided. The gas turbine may have an approximate size equivalent to a Rolls Royce RB211 turbine, which is about 5673 m$^3$/min (200,335 cfm). This turbine has a combustion air flow of about 4560 m$^3$/min (161,035 cfm), and a ventilation air flow of about 113 m$^3$/min (39,300 cfm). Alternate turbine sizes can be used with higher or lower air flow rates.

Air to be filtered is shown at arrows 14. The air passes through the system 10, filters it, and it then enters an inlet duct 18. The cleaned air, shown at arrows 15 then travel toward the gas turbine to provide a supply of combustible air to the gas turbine, which is significantly free of particles and aqueous solutions that could lead to damage or accumulation of corrosive deposits on the gas turbine.

The system 10 includes a filter house module 16. The filter house module 16 serves as an entry point for air to be filtered in the system 10. As such, the air flow at arrows 14 initially passes through the filter house module 16 on its way toward the gas turbine. The filter house module 16 may be serviced by an operator through an access point 20.

The filter housing module can include a hood arrangement 22. The hood arrangement 22 can be part of a stage 0 of the system 10. The hood arrangement 22 will typically include a plurality of weather hoods 24 to provide for protection against rain and snow. The hoods 24 are typically sloped to help foster drainage of any water collected on the hoods 24. As can be seen in FIG. 15, the hoods 24 are sloped downward in a direction upstream of the rest of the system 10, so that any collected water will be drained outside of the filter module 16 and system 10.

Typically, air 14 entering the hood arrangement 22 will have an entrance velocity of no greater than 4.5 m/s (886 fpm). The pressure drop across the weather hoods 24 will be less than 100 Pa (0.40 inch of water).

Downstream of the hood arrangement 22 is a louver arrangement 26. The louver arrangement 26 is part of a first stage, which is the stage encountered by the air entering the system 10 after the stage 0 hood arrangement 22. The louver arrangement 26 is provided to further foster or encourage coalescing and collection of water particles in the air. In preferred embodiments, the louver arrangement 26 will include stainless steel (or other materials) louvers 28. The air that enters the louver arrangement 26 will typically have a velocity of no greater than 5.6 m/s (1102 fpm). This higher velocity encourages inertial removal of water. The pressure drop across the louver arrangement 26 will typically be less than 57 Pa (0.23 inch of water).

Downstream of the first stage louver arrangement 26, a coalescer arrangement 42 may be provided as a second stage. The coalescer arrangement 42 has two primary operational modes. The first one of these operational modes includes the coalescer arrangement 42 removing relatively small aerosol droplets, such as salt aerosol droplets, from the air coming in at arrow 14. These small aerosol droplets are coalesced into larger aerosol droplets, for example, the droplets can be greater than about 20 microns in diameter. This coalescing process allows for drainage of a relatively large portion of liquid, such as salt water, rain, fog, mist, condensate, out and away from the air flow 14.

A second one of the operational modes of the coalescer arrangement 42 includes serving as a pre-filter. When serving as a pre-filter, the coalescer arrangement 42 has an efficiency of which may be such that the coalescer arrangement 42 captures and/or removes solid coarse particulates, including, for example, a majority of particulates having diameters of more than 1 micron, in some embodiments more than 3 microns, and in some embodiments, more than 5 microns, from the air flow 14. The coalescer arrangement 42, therefore, serves to extend the service life of the stages that are downstream of the coalescer arrangement 42.

The coalescer arrangement 42 can include a plurality of panel filter elements 44. Preferably, and in reference to FIG. 16, the panel filter elements 44 can be angled relative to each other in a zigzag arrangement 46. The zigzag arrangement 46 increases the amount of coalescing media area available by at least 33%, as compared to an arrangement that was not zigzagged and merely straight or flat. The zigzag arrangement 46 also helps to reduce media velocity through the coalescer arrangement 42 by at least 33%. This also helps to increase water removal efficiency for finer mists/aerosols.

In one example, the panel filter elements 44 comprise a mesh, such as a stainless steel mesh panel filter 48. Alternatives to the stainless steel panel filter 48 include a panel filter of a depth loading filter media, such as a meltblown media. The panel filter elements may also comprise pleated filter media and/or a watertight element. Methods of measuring the watertight characteristics of a filter element include, for example, the test described in International Publication No. WO 2012/034971, and in the Examples Section.

The coalescer arrangement 42 could be provided as a combined coalescer/prefilter, as one product, or a separate coalescer and a separate pre-filter, as possible or desired.

Downstream of the coalescer arrangement 42 is a final stage including an arrangement of watertight filters 50. The arrangement of watertight filters 50 prevents liquid or aqueous solutions of deliquesced or dissolved particles or dry/solid salt particles from the coalescer arrangement 42 that may have been re-released into the airflow and which also removes fine dry/solid particles from the air flow.

In preferred arrangements, the arrangement of watertight filters 50 is mounted at an angle to slope toward a direction of the incoming air 14. If the system 10 is on a relatively horizontal ground, the watertight filters 50 are mounted at an angle to slope in a downward direction upstream. A useful range of angles includes a slope between 1-25°, for example, about 10°. In some embodiments, the range of angles includes a slope between 5-15°. In this manner, any water or liquid captured by the watertight filters 50 is caused to drain by gravity into the upstream section of the system 10.

The watertight filter arrangement 50 has a filtration efficiency to remove both the dust particulates that penetrate the stages upstream to it and any fine dry salt particulates in the atmosphere from the air flow 14. In certain embodiments, the watertight filter arrangement 50 has an average filtration efficiency of greater 95% and/or a minimum filtration efficiency of at least 70%, as measured by European Standard EN 779 (April 2012).

Figure 17:
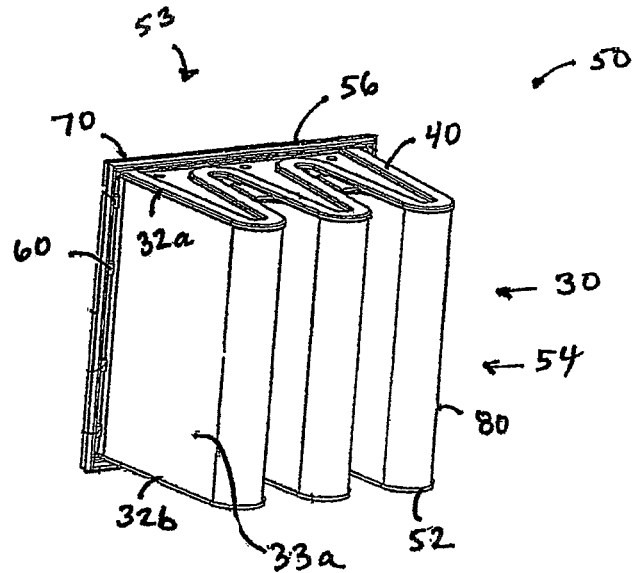
FIG. 17 is a perspective view of one embodiment of a watertight filter that is usable in the filtration system of FIGS. 15 and 16.

In one example arrangement, shown in FIG. 17, the watertight filters 50 are pleated filters 53. In preferred arrangements, the watertight filters pleated filters 53 have a media pack 30 forming a wave shape 54 forming a waveshaped filter element 56. One example filter element 56 that can be utilized is described in U.S. Patent Publication No. 2011/0067368.

Figure 18:
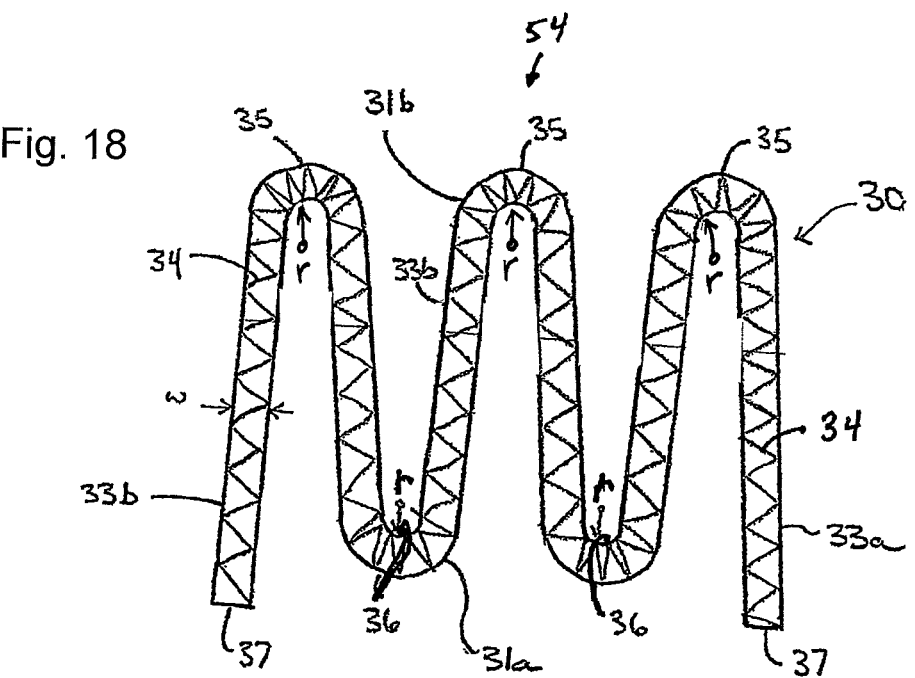
FIG. 18 is a schematic, cross sectional view of the filter media used in the watertight filter element of FIG. 17.

In FIG. 17, the media pack 30 has a first end 32a and an opposite second end at 32b. The media pack 30 includes a first lateral side 33a and a second lateral side 33b (FIG. 18). The first and second lateral sides 33a, 33b extend between the first and second opposite ends 32a, 32b. The media pack 30 can be constructed from a single section of seamless pleated media having a plurality of pleats 34 (FIG. 18). The pleats 34 are shown schematically in FIG. 18, and are not shown in FIG. 17 for purposes of clarity. As shown, the pleats 34 are longitudinally oriented such that the pleats 34 extend from the first and second opposite ends 32a, 32b and define the width of the media pack 30.

The media pack 30 can also be constructed with a structural or safety screen 80 on the upstream or downstream side 31a, 31b of the pleats 34. In FIG. 18, the media pack 30 has a cross section defined between the first and second lateral sides 33a, 33b. The cross section includes a plurality of outward projections 35, and in the embodiment shown, three outward projections 35. The media pack 30 can also have an inward recess 36, and as shown in the example in FIG. 18, has two inward recesses 36.

The outward projections 35 and inward recesses 36 define an internal radius r. As constructed, media pack 30 is formed around each radius such that a plurality of pleats 34 extends around each internal radius "r". In typical installations, the number of pleats 34 that extend around the internal radius "r" will be from 2 to 80 pleats, for example, 25 to 50 pleats. The internal radius "r" can be about 0.25 inch and up to about 4 inches, preferably between 0.6 inch and 0.9 inch, and most preferably about 0.75 inch. The internal radius can vary in other embodiments, as can the number of pleats per inch.

By use of the term "wave shape" to describe the example watertight pleated filter 53 shown in FIG. 17, it is meant that the cross section of media pack 30 has a shape including oppositely curved sections at the inward recesses 36 and outward projections 35 that are separated by either straight or curved sections of media pack 30.

In the embodiment shown in FIG. 17, the element 56 includes a first end cap 40 and a second end cap 52. End caps 40, 52 are for providing structural support for the filter element 50, for retaining the cross-sectional shape of the filter element 56, and for ensuring that the air to be filtered passes through the media pack 30 before traveling downstream to the intake system of the gas turbine.

In FIG. 17, the first end cap 40 is secured to the first end 32a, while the second end cap 52 is secured to the second end 32b of the media pack 30.

In the embodiment of FIG. 17, the filter element 56 includes a frame member 60. The frame member 60 holds a gasket 70, which is provided to form a seal against a tube sheet or other mounting surface in the filter house module 16 of the system 10.

Other embodiments of watertight filters 50 can be used, in addition to the example shown in FIGS. 17 and 18. Examples include mini-pleats, panel filters, bag filters, static cylindrical cartridge filters, etc. The watertight filters 50 used will typically have an airflow per filter element of about 70.9 m³/min (2504 cfm). The watertight filters 50 would have a pressure drop less than 375 Pa (1.50 inch of water). The media velocity of the air through the watertight filters 50 will typically be no greater than 0.2 m/s (40 fpm).

A useful arrangement of watertight filters 50 will typically include the following characteristics: a media area of between 300 and 320 sq. ft.; a rated air flow of 2500 cfm (synthetic filter media); a depth in inches of no greater than 20, typically 16-19 inches; about 75-85 individual filter elements; a media velocity in feet per minute of under 10 fpm; and a media velocity of less than 3 m/min, and typically 2-3 m/min.

One advantage of the system 10 is that due to the performance of the various stages described, the system 10 is free of water removal stages downstream of the final stage of watertight filters 50. There are no further water removal stages necessary downstream of the watertight filters 50. In certain embodiments, the system includes at least one stage (typically the coalescer arrangement and/or the watertight filter stage), wherein the inlet velocity per media area (or other inlet stage surface) is decreased relative to the previous stage. The actual inlet velocities to the media or surface of a stage will be determined by such parameters as inlet size and fluid flow rate.

Another of the advantages of the filtration system 10 is that a perimeter footprint of the system as viewed from the top (i.e., the view of FIG. 16) may be smaller as compared to prior art systems. Conventional low velocity systems would typically have a larger footprint to achieve the same performance as the disclosed system.

The system 10 can be utilized for a method for filtering air for a gas turbine. The method includes directed air to be filtered into a hood arrangement. This includes, for example, air 14 being directed into the hood arrangement 22. This would typically include having the air at a velocity of no greater than 4.5 m/s through the hood arrangement 22 at a pressure drop of less than 100 Pa. The hood arrangement 22 will help to shelter the incoming air 14 from rain or snow, for example.

The method can include, from the hood arrangement, directing the air into a louver arrangement. For example, this can include directing the air from hood arrangement 22 into louver arrangement 26. The air would be at a velocity of no greater than 5.6 m/s through the louver arrangement 26 at a pressure drop less than 60 Pa. The louver arrangement 26 can include louvers 28 to help coalesce water droplets into larger droplets and encourage draining of the liquid from the air.

The method can include directing the air from the louver arrangement and into a coalescer arrangement. For example, this can include directing the air from louver arrangement 26 into coalescer arrangement 42. This can include directing the air having a media velocity no greater than 3.0 m/s through the coalescer arrangement 42 at a pressure drop less than 175 Pa. This may also include directing the air through a plurality of panel filter elements 44. It may also include directing the air through panel filter elements 44 angled relative to each other in a zigzag arrangement 46. The panel filter elements 44 can include mesh, or depth loading filter media (such as meltblown media), or pleated filter media, or some combination. This step helps to further coalesce liquid droplets and help remove liquid from the air. It will also remove fine particulate.

The method can also include from the coalescer arrangement, directing the air into a final stage including an arrangement of watertight filters. For example, this can include directing the air from the coalescer arrangement 42 into watertight filters 50. This may further include directed the air having a media velocity of no greater than 0.2 m/s through the arrangement 50 at a pressure drop less than 375 Pa.

In one example, this step can include directing the air into an arrangement of pleated watertight filters having a wave shape, such as filter element 56.

During the step of directing air into the arrangement of watertight filters, there can further be a step of allowing liquid to drain by gravity from the watertight filters on an upstream side of the watertight filters 50.

The method of filtering air through the system 10 is free of water removal stages downstream of the final stage of watertight filters 50.

The above specification, examples and data provide a complete description of principles. Many embodiments can be made applying these principles.

EXEMPLARY EMBODIMENTS

1. An air filter medium comprising:
  a melt-blown filter layer comprising melt-blown fibers; and
  a high-efficiency glass-containing filter layer comprising glass fibers and multi-component binder fibers; and
  an optional support layer;
  wherein the layers are configured and arranged for placement in an air stream.
2. The filter medium of embodiment 1 wherein the melt-blown fibers have an average diameter of greater than 1.5 microns.
3. The filter medium of embodiment 1 or 2 wherein the melt-blown filter layer has a compressibility of greater than 40% at a pressure of 1.24 kg/cm².
4. The filter medium of any of embodiments 1 through 3 wherein the melt-blown filter layer is hydrophobic.
5. The filter medium of any of embodiments 1 through 4 wherein the melt-blown filter layer is the most upstream layer.
6. A filter medium comprising:
  a melt-blown filter layer comprising melt-blown fibers having an average diameter of greater than 1.5 microns; wherein the melt-blown filter layer has a compressibility of greater than 40% at a pressure of 1.24 kg/cm²;
  a high-efficiency glass-containing filter layer comprising glass fibers and multi-component binder fibers; and
  an optional support layer.
7. The filter medium of any of embodiments 1 through 6 wherein the layers are adhered together with an adhesive, thermal bonding, ultrasonic bonding, binder fibers, or a combination thereof (preferably, an adhesive, binder fibers, or a combination thereof).
8. The filter medium of embodiment 7 wherein the layers are adhered together with a hot melt adhesive.
9. The filter medium of embodiment 8 wherein the adhesive forms a continuous or patterned layer.
10. The filter medium of any of embodiments 1 through 9 wherein the support layer is positioned between the melt-blown layer and the glass-containing layer.
11. The filter medium of any of embodiments 1 through 9 wherein the glass-containing layer is positioned between the melt-blown layer and the support layer.
12. The filter medium of any of embodiments 1 through 11 wherein the melt-blown filter layer is electrostatically charged.
13. The filter medium of any of embodiments 1 through 12 wherein the melt-blown filter layer is hydrophobic and preferably includes fibers comprising a polyolefin, polybutylene terephthalate, polystyrene, ethylene-chloro-trifluoro-ethylene, polylactic acid, polycarbonate, nylon, polyphenylene suphide, or combinations thereof (preferably the fibers are hydrophobic and include a polyolefin, ethylene-chloro-trifluoro-ethylene, or combinations thereof).
14. The filter medium of embodiment 13 wherein the melt-blown fibers comprise polyolefin fibers.
15. The filter medium of embodiment 14 wherein the melt-blown fibers comprise polypropylene fibers.
16. The filter medium of any of embodiments 1 through 15 wherein the melt-blown fibers have an average diameter of at least 2 microns.
17. The filter medium of embodiment 16 wherein the melt-blown fibers have an average diameter of 2-3 microns.
18. The filter medium of any of embodiments 1 through 17 wherein the melt-blown filter layer has a basis weight of 5-100 g/m².
19. The filter medium of embodiment 18 wherein the melt-blown filter layer has a basis weight of 10-50 g/m².
20. The filter medium of any of embodiments 1 through 19 wherein the melt-blown layer comprises a composite of multiple layers of melt-blown fibers with larger fibers and more open structure at a first major surface of the melt-blown composite and smaller fibers and less open structure at a second major surface of the melt-blown composite.
21. The filter medium of any of embodiments 1 through 20 wherein the melt-blown layer comprises a continuously gradient structure of larger fibers and more open structure at a first major surface and smaller fibers and less open structure at a second major surface.
22. The filter medium of embodiment 20 or 21 wherein the second major surface is adjacent the support layer and the first major surface is positioned as the most upstream surface.
23. The filter medium of any of embodiments 1 through 22 wherein the glass-containing layer comprises up to 10 wt-% of a binder resin, based on the total weight of the glass-containing layer.
24. The filter medium of any of embodiments 1 through 23 wherein the melt-blown layer is 125-500 microns thick.
25. The filter medium of any of embodiments 1 through 24 wherein the melt-blown layer has a Frazier permeability (differential pressure set at 0.5 inch of water) of 20-1000 l/m²/sec) (or 20-600, or 80-1000, or 80-600, or 200-1000, or 200-600 l/m²/sec).
26. The filter medium of any of embodiments 1 through 25 wherein the melt-blown layer when electrostatically charged displays a filtration efficiency of at least 70% with 0.4-micron size DEHS (di-ethyl-hexyl-sebacat) particles at its rated velocity.
27. The filter medium of any of embodiments 1 through 26 wherein the glass-containing filter layer has a basis weight of 20-100 g/m².
28. The filter medium of embodiment 27 wherein the glass-containing filter layer has a basis weight of 30-70 g/m².
29. The filter medium of any of embodiments 1 through 28 wherein the glass-containing filter layer has a compressibility of less than 40 percent at a pressure of 1.24 kg/cm².
30. The filter medium of any of embodiments 1 through 29 wherein the glass fibers have an average diameter of less than 2 microns (and often less than 1 micron).
31. The filter medium of any of embodiments 1 through 30 wherein the multi-component binder fibers of the glass-containing filter layer comprise bicomponent fibers having a low melting point polyester sheath and a high melting point polyester core.

32. The filter medium of any of embodiments 1 through 31 wherein the glass-containing filter layer further comprises polyester fibers distinct from the multi-component binder fibers.
33. The filter medium of any of embodiments 1 through 32 wherein the glass-containing filter layer is created using a wet-laid process.
34. The filter medium of any of embodiments 1 through 33 wherein the glass-containing filter layer 125-500 microns thick.
35. The filter medium of any of embodiments 1 through 34 wherein the glass-containing filter layer has a Frazier permeability (differential pressure set at 0.5 inch of water) of 8-400 l/m$^2$/sec (or 8-200, or 20-400, or 20-200 l/m$^2$/sec).
36. The filter medium of any of embodiments 1 through 35 wherein the glass-containing filter layer displays a filtration efficiency of at least 70% with 0.4-micron size DEHS (di-ethyl-hexyl-sebacat) particles at its rated velocity.
37. The filter medium of any of embodiments 1 through 36 comprising a support layer.
38. The filter medium of embodiment 37 wherein the support layer comprises fibers having an average diameter of at least 5 microns (preferably, at least 10 microns).
39. The filter medium of embodiment 38 wherein the support layer is a spunbond support layer.
40. The filter medium of any of embodiments 37 through 39 wherein the support layer has a Gurley stiffness of 100 grams or more (preferably, 300 grams or more).
41. The filter medium of any of embodiments 37 through 40 wherein the support layer has a basis weight of 70-260 g/m$^2$.
42. The filter medium of any of embodiments 1 through 41 wherein the glass-containing filter layer comprises a hydrophobic coating.
43. The filter medium of embodiment 42 wherein the hydrophobic coating comprises a fluorochemical.
44. The filter medium of any of embodiments 1 through 43 which is corrugated.
45. The filter medium of any of embodiments 1 through 44 which displays a hydrostatic head of at least 10 inches (25.4 cm) of water (or at least 15 inches (38.1 cm) of water, or at least 20 inches (50.8 cm) of water).
46. The filter medium of any of embodiments 1 through 45 which displays a filtration efficiency of at least 70% with 0.4-micron size DEHS particles at its rated velocity.
47. The filter medium of any of embodiments 1 through 46 which displays a filtration efficiency is at least 85% (or at least 95%, or at least 99.5%, or at least 99.95%, or at least 99.995%) of the most penetrating particle size particles (MPPS) at its rated velocity (i.e., rated flow rate).
48. The filter medium of any of embodiments 1 through 47 which displays a salt loading capacity of at least 10 g/m$^2$.
49. The filter medium of any of embodiments 1 through 48 comprising two or more melt-blown filter layers.
50. The filter medium of any of embodiments 1 through 49 comprising two or more glass-containing filter layers.
51. A filter element comprising a housing and a filter medium of any of embodiments 1 through 50.
52. The filter element of embodiment 51 wherein the filter medium is pleated.
53. The filter element of any of embodiments 51 through 52 which displays an efficiency of at least F9 per EN779:2012.
54. The filter element of embodiment 53 which displays an efficiency of at least E10 per EN1822:2009.
55. The filter element of embodiment 54 which displays an efficiency of at least E11 per EN1822:2009.
56. The filter element of any of embodiments 51 through 55 which is watertight.
57. The filter element of any of embodiments 51 through 56 which displays a dust loading capacity of at least 30 g/m$^2$ of ASHRAE dust (per ASHRAE 52.2-2007 or EN779:2012) when loaded to 4 inches of water dp (i.e., 1000 Pa pressure drop) in static mode.
58. The filter element of any of embodiments 51 through 57 positioned in a gas turbine inlet system.
59. A method of filtering air, the method comprising directing the air through a filter medium or filter element of any one of embodiments 1 through 58.
60. A method of filtering air, the method comprising directing the air through a filter medium comprising:
   a melt-blown filter layer comprising melt-blown fibers;
   a high-efficiency glass-containing filter layer comprising glass fibers and multi-component binder fibers; and
   a support layer;
   wherein the melt-blown filter layer is the most upstream layer.

EXAMPLES

Objects and advantages of this disclosure are further illustrated by the following examples, but the particular materials and amounts thereof recited in these examples, as well as other conditions and details, should not be construed to unduly limit this disclosure.
Test Methods
Frazier Permeability Test
The permeability of the media was measure using a Frazier Permeability Tester at 0.5 inch (in) H$_2$O (125 Pascals (Pa)) in accordance with ASTM D737.
Hydrostatic Head Test
This is to test the bulk water penetration through media. The tests are performed using a TEXTEST FX3000 Hydrostatic Head tester II, but any tester that conforms to the standards AATCC 127, BS 2, 823, DIN 53,886, EDANA 120.1-80, INDA IST 80.4, ISO 811, ISO 1,420A, JIS L 1,092 B would be acceptable. A sample that is at least 5.5 inches (14 cm) square is placed in the tester with the upstream side face down and then clamped into place. Water pressure is applied to the upstream side of the sample at a gradually increasing value (a gradient of 60 mbar/min) until 3 water droplets are seen on the downstream surface of the media. At this point the test is stopped and the terminal pressure is recorded.
Salt Loading Test
This is to test how much dust or particulate the media can capture and hold before it is plugged up. A TSI 3160 bench is used to load the filtration media with salt and record the salt loaded, salt passed and dP across the media for a particular face velocity. The media is placed in the bench so that the airflow is the same as it would be in the real world. The other settings for the bench are to be run to the manufacturer's standards. The amount of salt loaded at 2 inches (500 Pa) and 4 inches (1000 Pa) of water column is recorded.
Water Spray Test
This test is to evaluate how much the filter element can prevent water droplets getting through the element, so to test the watertightness of the element. A filter element is placed into a 24-inch×24-inch (61-cm×61-cm) duct. An SU4 nozzle is installed in the duct 64" (163 cm) away and facing the element. The nozzle is centered horizontally with the center of the element. A water rotometer is installed in the line to control and monitor the water flow rate. Air is pulled through the element using a pump so that the element(s) are run at their rated flow rate.

The water spray is generated by feeding 60 psi (413.7 kPa) of compressed air into the nozzle and the element was challenged with a water flow rate of 0.5-1 liter/minute. The test lasts 6 hours or more. The dP across the element is recorded during the test. The water downstream of the element is collected and measured when the test is finished.

EN1822 Test

This is a European standard for high efficiency filter testing and classification. A filter element is installed in an ASHRAE duct. Air is pulled through the element at the rated flow, and the element is challenged with DEHS particles varying from 0.02 to 0.6 microns. The number of particles of a particular size are measured upstream and downstream of the filter using an SMPS and an APS, and 100×(1−downstream particles/upstream particles) equals the efficiency at that particle size. The efficiency of the element is tested before and after soaked in an IPA bath, to remove the electrostatic effects if applicable.

Dust Holding Capacity Test (DHC Test)

This test is to evaluate the filter life in a lab test condition. A filter element is installed in an ASHRAE duct. Air flows through the element(s) at the rated flow while ASHRAE dust is fed into the duct per EN779:2012 standard (except the final dP has been increased to 4 inches) or ASHRAE 52.2 standard. The pressure drop across the element(s) is measured and the amount of dust fed is recorded at the multiple pre-determined pressure drop points.

EN779:2012

In this standard a filter or filter pair is loaded into an ASHRAE duct. The element is then loaded progressively, with dust specified in ASHRAE 52.2, while it is run at the manufacturers rated speed. The efficiency of the element is measured at initial and at various stages of progressive loading. At 1.8 inches of W.C. (450 Pa) the test is stopped and the amount of dust captured is recorded, which gives the dust holding capacity at that dP (DHC). The average efficiency of the element is calculated by weight average of efficiency at various pressure drop points. To classify the level of the element performance, a further efficiency test of a sheet of media is required after IPA soak, where a sample of media like the one used in the element is soaked in 99.5% pure IPA for two minutes then dried for 24 hours. The sample is challenged with DEHS particles at 100% of the face velocity the element would see if it was run at the rated speed. The efficiency is recorded.

EXAMPLES

Example 1

Laminated filter media were prepared using the following technique. A roll of 30 gsm polypropylene melt-blown filter material was purchased from H&V of Floyd, Va. (Product Number PE13030CA, electrostatically charged as obtained from the supplier). A 42-gsm wet-laid filter material that includes a mixture of glass and bicomponent PET fibers was prepared similar to that of Example 6 in U.S. Pat. No. 7,314,497 (with the modification that it consists of 40% B08 microglass fibers from Lauscha Fiber Internatonal (Lauscha, Germany) and 60% TJ04BN bicomponent PET fibers from Teijin (Osaka, Japan)). A spunbond support material of 100 gsm of FINON C310NW was purchased from Midwest Filtration of Cincinnati, Ohio. The sheet properties are in Table 1.

TABLE 1

Properties of the components of Example 1

| Property | Units | PE13030CA | FINON C310NW | EN929 |
|---|---|---|---|---|
| Basis Weight | lbs./3000 ft$^2$ | 18.4 | 61.5 | 26 |
|  | grams/m$^2$ | 30 | 100 | 42 |
| Fiber Size | μm | 2.9 | 17.4 | 0.8/14 |
| Thickness (1.5 pounds per square inch (psi)) | Inches | 0.0101 | 0.008 | 0.0071 |
|  | Mm | 0.257 | 0.203 | 0.183 |
| Frazier Permeability @ 0.5 inches (in) H$_2$O (125 Pascals (Pa)) | Fpm | 47.5 | 108 | 22.4 |
|  | l/m$^2$/sec | 380 | 864 | 179 |
| Hydrostatic Head | Mbar | 41.50 | 6.00 | 8.00 |
| NO IPA MPPS DEHS efficiency 4 feet per minute (fpm) (2.0 centimeters/seconds (cm/s)) | % | 96.69 | <10% | 95.14 |
| Post IPA soak MPPS DEHS efficiency 4 fpm (2.0 cm/s) | % | 40.21 | <10% | 93.83 |

These three rolls were layered so that the melt-blown layer was upstream, the wet-laid layer was in the middle, and the spunbond layer was on the bottom. The three layers were heat laminated at 265° F. using a copolyester hotmelt adhesive available under the tradename GRILTEX 9E, a granular adhesive from EMS-Griltech of Switzerland, at a rate of 4.07 g/m$^2$ between each layer.

The material was then corrugated to an average depth of 0.0275 inches (0.699 mm) (measuring the distance in the z direction from the top of the peak to the bottom of the trough on the wire side of the media) with 4.5 corrugations/inch (1.77 corrugations/cm). The flat sheet media was pleated at 2 inches (5.1 cm) pleat depth (with PLEATLOC separation) and built into a 26×2 inch (66×2 cm) conical and cylindrical filter pair. The conical elements had 280 pleats per element while the cylindrical elements had 230. The elements were built such that the melt-blown layer was facing upstream.

The laminated and corrugated media was tested for its flat sheet properties, and the elements were tested for efficiency, water repellency and dust holding capacity (DHC) per EN1822, the Water Spray Test, and EN779:2012 respectively. The results are shown in Table 2.

TABLE 2

Properties of the laminated media and element

| Property and test results | Units | Example 1 before corrugation | Example 1 after corrugation |
|---|---|---|---|
| Basis Weight | lbs./3000 ft$^2$ | 105.9 | 105.9 |
|  | gram/m$^2$ | 172.3 | 172.3 |
| Thickness (1.5 psi) | inches | 0.0302 |  |
|  | mm | 0.767 |  |
| Frazier Permeability @ 0.5 in H$_2$O (125 Pa) | fpm | 13.60 | 12.83 |
|  | l/m$^2$/sec | 108.8 | 102.6 |
| Hydrostatic Head | Mbar | 91.33 | 85.17 |
| NO IPA MPPS DEHS efficiency 4 fpm (2.0 cm/s) | % | 99.56 | 99.73 |
| Post IPA soak MPPS DEHS efficiency 4 fpm (2.0 cm/s) | % | 91.68 | 91.66 |
| Flat sheet salt loading at 4 inches and 3.6 fpm (62 cm$^2$) | mg | 158.00 | 180.00 |

TABLE 2-continued

Properties of the laminated media and element

| Property and test results | Units | Example 1 before corrugation | Example 1 after corrugation |
|---|---|---|---|
| Corrugation Depth | inches | — | 0.0275 |
|  | mm |  | 0.6985 |
| Element dP | in. H$_2$O | — | 0.70 |
|  | Pa |  | 175 |
| Element Efficiency (pre IPA) | % | — | 98.80 |
| Element Efficiency (post IPA) | % | — | 95.40 |
| Element DHC at 4 in W.C. (1000 Pa) | grams | — | 447 (cylindrical only) |
| Water Spray Test - final dP | in. H$_2$O | — | 2 |
|  | Pa |  | 500 |
| Water Spray Test - water downstream | ml | — | 0 |

Example 2

Laminated filter media were prepared using the following technique. A roll of polypropylene melt-blown filter material was purchased from H&V of Floyd, Va. (Product Number PE13030CA, electrostatically charged as obtained from the supplier). A 55 gsm wet-laid filter material that includes a mixture of glass and bicomponent fibers was prepared similar to that of Example 6 in U.S. Pat. No. 7,314,497 (with the modification that it consists of 40% B08F microglass fibers from Lauscha Fiber International (Lauscha, Germany) and 60% TJ04BN 2d×5 mm fibers from Teijin (Osaka, Japan)). A spunbond support material of FINON C310NW was purchased from Midwest Filtration of Cincinnati, Ohio. The sheet properties are in Table 3.

TABLE 3

Properties of the components of Example 2

| Property | Units | PE13030CA | FINON C310NW | EN1018 |
|---|---|---|---|---|
| Basis Weight | lbs./3000 ft$^2$ | 18.4 | 61.5 | 34 |
|  | grams/m$^2$ | 30 | 100 | 55 |
| Fiber Size | μm | 2.9 | 17.4 | 0.8/14 |
| Thickness (1.5 psi) | Inches | .0101 | .008 | .0105 |
|  | Mm | 0.257 | 0.203 | 0.268 |
| Frazier Permeability @ 0.5 in H$_2$O | Fpm | 47.50 | 108 | 16.5 |
|  | l/m$^2$/sec | 380 | 864 | 132 |
| Hydrostatic Head | Mb | 41.50 | 6.00 | 8.00 |
| NO IPA MPPS DEHS efficiency 4 fpm (2.0 cm/s) | % | 96.69 | <10% | 92 |
| Post IPA soak MPPS DEHS efficiency 4 fpm (2.0 cm/s) | % | 40.21 | <10% | 89 |

These three rolls of media were provided to JDX Nippon (Dalton, Ga.) for processing. The Layers were laminated with hot spray adhesive by JDZ Nippon with direction to use the minimum amount of adhesive possible. The layers were positioned such that the melt-blown layer was upstream, the spunbond layer was in the middle and the wet-laid media was downstream The material was then corrugated to an average depth of 0.0265 inch (0.67 mm), (measuring the distance in the z direction from the top of the peak to the bottom of the trough on the wire side of the media) with 4.5 corrugations per inch (1.77 corrugations/cm).

The flat sheet media was pleated at 2 inches (5.1 cm) pleat depth with (with PLEATLOC separation) and built into a 26-inch (66-cm) conical and cylindrical filter pair. The conical elements had 280 pleats per element while the cylindrical elements had 230. The elements were built such that the melt-blown layer was facing upstream.

The laminated and corrugated media was tested for its flat sheet properties, and the elements were tested for efficiency, water repellency and dust holding capacity using EN1822, the Water Spray Test, and the dust holding capacity test (DHC) using EN779:21012 respectively. The results are shown in Table 4.

TABLE 4

Properties of the laminated media and element

| Property | Units | Example 2 before corrugation | Example 2 after corrugation |
|---|---|---|---|
| Basis Weight | lbs./3000 ft$^2$ | 113.9 | 113.9 |
|  | grams/m$^2$ | 185.4 | 185.4 |
| Thickness (1.5 psi) | inches | 0.0275 | — |
|  | mm | 0.699 |  |
| Frazier Permeability @ 0.5 in H$_2$O (125 Pa) | fpm | 6.01 | 6.21 |
|  | l/m$^2$/sec | 48.1 | 49.7 |
| Hydrostatic Head | mb | 61 | 70 |
| NO IPA MPPS DEHS efficiency 4 fpm (2.0 cm/s) | % | 99.92 | 99.83 |
| Post IPA soak MPPS DEHS efficiency 4 fpm (2.0 cm/s) | % | 96.37 | 94.32 |
| Flat sheet salt loading at 4 in (1000 Pa) and 3.6 fpm (1.8 cm/s) at 62 cm$^2$ | mg | 71 | 102 |
| Corrugation Depth | inches | — | 0.0265 |
|  | mm |  | 0.673 |
| Element dP | in. H$_2$O | — | 0.80 |
|  | Pa |  | 200 |
| Element Efficiency (pre IPA) | % | — | 99.52 |
| Element Efficiency (post IPA) | % | — | 95.80 |
| Element DHC at 4 in W.C. (1000 Pa) | grams | — | 371 (cylindrical element only) |
| Water Spray Test - final dP | in. H$_2$O | — | 5.2 |
|  | Pa |  | 1300 |
| Water Spray Test - water downstream | ml | — | 0 |

Example 3

Laminated filter media were prepared using the following technique. A roll of polypropylene melt-blown filter material was purchased from H&V of (Floyd, Va.) (Product Number PE13030CA, electrostatically charged as obtained from the supplier). A 50 gsm wet-laid filter material that includes a mixture of glass and bicomponent fibers was prepared similar to that of Example 6 in U.S. Pat. No. 7,314,497 (with the modification that it consists of 50% B08 microglass fibers from Lauscha Fiber International (Lauscha, Germany) and 50% bicomponent PET fibers (TJ04BN) from Teijin (Osaka, Japan)). A spunbond support material of FINON C310NW was purchased from Midwest Filtration of Cincinnati, Ohio. The sheet properties are in Table 5.

TABLE 5

Properties of the components of Example 3

| Property | Units | EN0701937 | PE13030CA | FINON C310NW |
|---|---|---|---|---|
| Basis Weight | lbs./3000 ft$^2$ | 30.5 | 18.4 | 61.5 |
|  | grams/m$^2$ | 50 | 30 | 100 |
| Fiber Size | μm | 0.8/14 | 2.9 | 17.4 |
| Thickness (1.5 psi) | Inches | 0.0115 | 0.0101 | 0.008 |
|  | Mm | 0.292 | 0.257 | 0.203 |
| Frazier Permeability @ 0.5 in H$_2$O (125 Pa) | Fpm | 10.10 | 47.50 | 108.00 |
|  | l/m$^2$/sec | 81 | 380 | 864 |
| Hydrostatic Head | Mb | 16.00 | 41.50 | 6.00 |
| NO IPA MPPS DEHS efficiency 4 fpm (2.0 cm/s) | % | 98.81 | 96.69 | <10% |
| Post IPA soak MPPS DEHS efficiency 4 fpm (2.0 cm/s) | % | 98.03 | 40.21 | <10% |

These three rolls were layered so that the melt-blown layer was upstream, the wet-laid layer was in the middle and the spunbond layer was downstream. The three layers were heat laminated at 265° F. using a copolyester hotmelt adhesive available under the tradename GRILTEX 9E, a granular adhesive from EMS-Griltech of Switzerland, at a rate of 4.07 g/m$^2$ between each layer.

The material was then corrugated to an average depth of 0.0302 inch (0.762 mm) (measuring the distance in the z direction from the top of the peak to the bottom of the trough on the wire side of the media) with 4.5 corrugations per inch (1.77 corrugations/cm). The flat sheet media was pleated at 2 inches (5.1 cm) pleat depth (with PLEATLOC Separation) and built into 26-inch (66-cm) conical and cylindrical filter pairs. The conical elements had 280 pleats per element while the cylindrical elements had 230. The elements were built such that the melt-blown layer was facing upstream.

The laminated and corrugated media was tested for its flat sheet properties, and the elements were tested for efficiency, water repellency and dust holding capacity using EN1822, the Water Spray Test, and the dust holding capacity test (DHC) as per EN779:2012 respectively. The results are shown in Table 6.

TABLE 6

Properties of the laminated media

| Property | Units | Example 3 before corrugation | Example 3 after corrugation |
|---|---|---|---|
| Basis Weight | lbs./3000 ft$^2$ | 110.4 | 110.4 |
|  | grams/m$^2$ | 180 | 180 |
| Thickness (1.5 psi) | inches | 0.0313 |  |
|  | Mm | 0.795 |  |
| Frazier Perm @ 0.5 in H$_2$O (125 Pa) | Fpm | 7.95 | 7.70 |
|  | l/m$^2$/sec | 63.6 | 61.6 |
| Hydrostatic Head | Mb | 86.33 | 10.33 |
| NO IPA MPPS DEHS efficiency 4 fpm (2 cm/s) | % | 99.97 | 99.46 |
| Post IPA soak MPPS DEHS efficiency 4 fpm (2 cm/s) | % | 99.39 | 95.93 |
| Flat sheet salt loading at 10 inches (2500 Pa) and 3.6 fpm (1.8 cm/s) for 62 cm$^2$ | Mg | 142.00 | 180.00 |
| Corrugation Depth | Inches | — | 0.030 |
|  | Mm |  | 0.762 |

Example 4

Laminated filter media were prepared using the following technique. A roll of polypropylene melt-blown filter material was purchased from H&V of Floyd, Va. (Product Number PE13030CA, electrostatically charged as obtained from the supplier). A 50 gsm wet-laid filter material including a mixture of glass and bicomponent fibers was prepared similar to that of Example 6 in U.S. Pat. No. 7,314,497 (with the modification that it consists of 50% B08F microglass fibers from Lauscha Fiber Interational (Lauscha, Germany) and 50% bicomponent PET fibers (TJ04BN) from Teijin (Osaka, Japan)). A spunbond support material of FINON C310NW was purchased from Midwest Filtration of Cincinnati, Ohio. The sheet properties are in Table 7.

TABLE 7

Properties of the components of Example 4

| Property | Units | EN0701937 | PE13030CA | FINON C310NW |
|---|---|---|---|---|
| Basis Weight | lbs./3000 ft$^2$ | 30.5 | 18.4 | 61.5 |
|  | grams/m$^2$ | 50 | 30 | 100 |
| Fiber Size | μm | 0.8/14 | 2.9 | 17.4 |
| Thickness (1.5 psi) | Inches | 0.0115 | 0.0101 | 0.008 |
|  | Mm | 0.292 | 0.257 | 0.203 |
| Frazier Permeability @ 0.5 in H$_2$O (125 Pa) | Fpm | 10.10 | 47.50 | 108.00 |
|  | l/m$^2$/sec | 81 | 380 | 864 |
| Hydrostatic Head | Mb | 16.00 | 41.50 | 6.00 |
| NO IPA MPPS DEHS efficiency 4 fpm (2 cm/s) | % | 98.81 | 96.69 | <10% |
| Post IPA soak MPPS DEHS efficiency 4 fpm (2 cm/s) | % | 98.03 | 40.21 | <10% |

These three rolls were layered so that the melt-blown layer was upstream, the spunbond layer was in the middle, and the wet-laid layer was downstream. The three layers were heat laminated at 265° F. using a copolyester hotmelt adhesive available under the tradename GRILTEX 9E, a granular adhesive from EMS-Griltech of Switzerland, at 4.07 g/m$^2$ between each layer.

The material was then corrugated to an average depth of 0.031 inch (0.787 mm) (measuring the distance in the z direction from the top of the peak to the bottom of the trough on the wire side of the media) with 4.5 corrugations per inch (1.77 corrugations/cm). The flat sheet media was pleated at 2 inches (5.1 cm) pleat depth (with PLEATLOC separation) and built into 26-inch (66-cm) conical and cylindrical filter pairs. The conical elements had 280 pleats per element while the cylindrical elements had 230. The elements were built such that the melt-blown layer was facing upstream.

The laminated and corrugated media was tested for its flat sheet properties, and the elements were tested for efficiency, water repellency and dust holding capacity using EN1822, the Water Spray Test, and the dust holding capacity test (DHC) respectively. The results are shown in Table 8.

TABLE 8

Properties of the laminated media and element for Example 4

| Property | Units | Example 4 before corrugation | Example 4 after corrugation |
|---|---|---|---|
| Basis Weight | lbs./3000 ft$^2$ | 110.4 | 110.4 |
| | grams/m$^2$ | 180 | 180 |
| Thickness (1.5 psi) | Inches | 0.0327 | |
| | Mm | 0.831 | |
| Frazier Perm @ 0.5 in H$_2$O (125 Pa) | Fpm | 7.65 | 7.35 |
| | l/m$^2$/sec | 61.2 | 58.8 |
| Hydrostatic Head | Mb | 77.67 | 20.17 |
| NO IPA MPPS DEHS efficiency 4 fpm (2 cm/s) | % | 99.95 | 99.89 |
| Post IPA soak MPPS DEHS efficiency 4 fpm (2 cm/s) | % | 99.36 | 98.01 |
| Flat sheet salt loading at 10" (2500 Pa) and 3.6 fpm (1.8 cm/s) for 62 cm$^2$ | Mg | 182.00 | 172.00 |
| Corrugation Depth | Inches | — | 0.031 |
| | Mm | | 0.787 |
| Element dP | in. H$_2$O | — | 1.00 |
| | Pa | | 250 |
| Element Efficiency (pre IPA) | % | — | 99.10 |
| Element Efficiency (post IPA) | % | — | 97% |
| Element DHC at 4 in W.C. (1000 Pa) | Grams | — | 1601 (pair) |
| Water Spray Test - final dP | in. H$_2$O | — | 1.8 |
| | Pa | | 450 |
| Water Spray Test - water downstream | Ml | — | 0 |

Example 5

Laminated filter media was prepared using the following technique. A roll of polypropylene melt-blown filter material was purchased from H&V of Floyd, Va. (Product Number PE13030CA, electrostatically charged as obtained from the supplier). A 50 gsm wet-laid filter material including a mixture of glass and bicomponent fibers was prepared similar to that of Example 6 in U.S. Pat. No. 7,314,497 (with the modification that it consists of 50% B08F microglass fibers from Lauscha Fiber Interational (Lauscha, Germany) and 50% bicomponent PET fibers (TJ04BN) from Teijin (Osaka, Japan)). A spunbond support material of FINON C310NW was purchased from Midwest Filtration of Cincinnati, Ohio. The sheet properties are in Table 9.

TABLE 9

Properties of the components of Example 5

| Property | Units | EN0701937 | PE13030 CA | FINON C310NW |
|---|---|---|---|---|
| Basis Weight | lbs./3000 ft$^2$ | 30.5 | 18.4 | 61.5 |
| | grams/m$^2$ | 50 | 30 | 100 |
| Fiber Size | μm | 0.8/14 | 2.9 | 17.4 |
| Thickness (1.5 psi) | Inches | 0.0115 | 0.0101 | 0.008 |
| | Mm | 0.292 | 0.257 | 0.203 |
| Frazier Permeability @ 0.5 in H$_2$O (125 Pa) | Fpm | 10.10 | 47.50 | 108.00 |
| | l/m$^2$/sec | 81 | 380 | 864 |
| Hydrostatic Head | Mb | 16.00 | 41.50 | 6.00 |
| NO IPA MPPS DEHS efficiency 4 fpm (2 cm/s) | % | 98.81 | 96.69 | <10% |
| Post IPA soak MPPS DEHS efficiency 4 fpm (2 cm/s) | % | 98.03 | 40.21 | <10% |

These three rolls were layered so that the melt-blown layer was upstream, the spunbond layer was in the middle and the wet-laid layer was downstream. The three layers were heat laminated at 265° F. using a copolyester hotmelt adhesive available under the tradename GRILTEX 9E, a granular adhesive from EMS-Griltech of Switzerland, at a rate of 4.07 g/m$^2$ between each layer.

The material was then corrugated to an average depth of 0.027 inch (0.686 mm) (measuring the distance in the z direction from the top of the peak to the bottom of the trough on the wire side of the media) with 4.5 corrugations per inch (1.77 corrugations/cm). The flat sheet media was pleated at 2 inches (5.1 cm) pleat depth (with PLEATLOC separation) and built into 26-inch (66-cm) conical and cylindrical filter pairs. The conical elements had 280 pleats per element while the cylindrical elements had 230. The elements were built such that the melt-blown layer was facing upstream.

The laminated and corrugated media was tested for its flat sheet properties, and the elements were tested for efficiency, water repellency and dust holding capacity using EN1822, the Water Spray Test, and the dust holding capacity test (DHC) respectively. The results are shown in Table 10.

TABLE 10

Properties of the laminated media and element for example 5

| Property | Units | Example 5 before corrugation | Example 5 after corrugation |
|---|---|---|---|
| Basis Weight | lbs./3000 ft$^2$ | 110.4 | 110.4 |
| | grams/m$^2$ | 180 | 180 |
| Thickness (1.5 psi) | Inches | 0.0307 | |
| | Mm | 0.780 | |
| Frazier Permeability @ 0.5 in H$_2$O (125 Pa) | Fpm | 7.30 | 7.20 |
| | l/m$^2$/sec | 58.4 | 57.6 |
| Hydrostatic Head | Mb | 79.67 | 76.17 |
| NO IPA MPPS DEHS efficiency 4 fpm (2 cm/s) | % | 99.94 | 99.96 |
| Post IPA soak MPPS DEHS efficiency 4 fpm (2 cm/s) | % | 99.40 | 98.90 |
| Flat sheet salt loading at 10" (2500 Pa) and 3.6 fpm (1.8 cm/s) at 62 cm$^2$ | Mg | — | 217.00 |
| Corrugation Depth | Inches | — | 0.027 |
| | Mm | | 0.686 |
| Element dP | in. H$_2$O | — | 1.10 |
| | Pa | | 275 |
| Element Efficiency (pre IPA) | % | — | 99.88 |
| Element Efficiency (post IPA) | % | — | 98.27 |
| Element DHC at 4 in W.C. (1000 Pa) | Grams | — | 731 (cylindrical only) |
| Water Spray Test - final dP | in. H$_2$O | — | 2.35 |
| | Pa | | 588 |
| Water Spray Test - water downstream | Ml | — | 2.50 |

Example 6

Laminated filter media are prepared using the following components: a roll of polypropylene melt-blown fibers, a wet-laid roll including a mixture of glass and bicomponent PET fibers, a roll of spunbond very similar to the ones cited above. A roll of scrim is used to create a layer downstream from the glass-containing layer. The scrim has a very high perm (greater than 1600 l/m$^2$/s) and as thin as possible (less than 0.005 inch) so there is a minimal effect on the flat sheet or filter element performance.

The four layers are laminated together so the melt-blown layer is the furthest upstream, the spunbond is downstream from the melt-blown layer, the wet-laid glass-containing layer is just downstream of the spunbond layer, and the scrim is on the most downstream side. The adhesive (e.g., the adhesive used in Examples 1, 3, 4, and 5) used during lamination is chosen to minimize the effect it would have on the laminated structure (i.e., the permeability of the 4 layers together without any glue is similar to that of the laminate). The material could then be corrugated and pleated into 26-inch (66-cm) conical and cylindrical pairs.

Example 7

Any of the filter media of Examples 1 through 6 are built with a glass-containing layer that has been hydrophobically treated to improve water repellency. Data is shown below.

TABLE 11

Properties of the components of Example 7

| Property | Units | Treated EN0701937 | PE13030CA | FINON C310NW |
|---|---|---|---|---|
| Basis Weight | lbs./3000 ft² | 30.5 | 18.4 | 61.5 |
|  | grams/m² | 50 | 30 | 100 |
| Fiber Size | μm | 0.8/14 | 2.9 | 17.4 |
| Thickness (1.5 psi) | Inches | 0.094 | 0.0101 | 0.008 |
|  | Mm | 0.24 | 0.257 | 0.203 |
| Frazier Permeability @ 0.5 in H₂O (125 Pa) | Fpm | 8.1 | 47.50 | 108.00 |
|  | l/m²/sec | 64.8 | 380 | 864 |
| Hydrostatic Head | Mb | 61 | 41.50 | 6.00 |
| NO IPA MPPS DEHS efficiency 4 fpm (2 cm/s) | % | 98.8 | 96.69 | <10% |
| Post IPA soak MPPS DEHS efficiency 4 fpm (2 cm/s) | % | 98.9 | 40.21 | <10% |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed:

1. An air filter medium comprising:
   a melt-blown filter layer comprising melt-blown fibers; and
   a high-efficiency glass-containing filter layer comprising glass fibers and multi-component binder fibers; and
   an optional support layer;
   wherein the layers are configured and arranged for placement in an air stream;
   further wherein the glass-containing layer comprises a hydrophobic coating, wherein the glass-containing layer is coated with the hydrophobic coating.

2. The filter medium of claim 1, wherein the hydrophobic coating comprises a fluorochemical.

3. The filter medium of claim 1, wherein the melt-blown filter layer is the most upstream layer.

4. The filter medium of claim 1, wherein the glass-containing filter layer is positioned between the melt-blown filter layer and the support layer.

5. The filter medium of claim 1, wherein the multi-component binder fibers of the glass-containing filter layer comprise bicomponent fibers having a low melting point polyester sheath and a higher melting point polyester core.

6. The filter medium of claim 1, wherein the melt-blown filter layer is electrostatically charged.

7. The filter medium of claim 1 comprising a support layer, wherein the support layer is a spunbond layer.

8. The filter medium of claim 1, wherein the filter medium displays a hydrostatic head of at least 10 inches (25.4 cm) of water.

9. The filter medium of claim 1, wherein two or more layers are laminated together.

10. An air filter medium comprising:
    a melt-blown filter layer comprising melt-blown fibers having an average diameter of greater than 1.5 microns; and
    a high-efficiency glass-containing filter layer comprising glass fibers having an average diameter of less than 2 microns and multi-component binder fibers; and
    a support layer;
    wherein the melt-blown filter layer is the most upstream layer and the glass-containing layer is positioned between the melt-blown layer and the support layer.

11. The filter medium of claim 10, wherein the glass-containing layer comprises a hydrophobic coating, wherein the glass-containing layer is coated with the hydrophobic coating.

12. The filter medium of claim 11, wherein the hydrophobic coating comprises a fluorochemical.

13. The filter medium of claim 10, wherein two or more layers are laminated together.

14. The air filter medium of claim 10, wherein the multi-component binder fibers of the glass-containing filter layer comprise bicomponent fibers having a low melting point polyester sheath and a higher melting point polyester core.

15. The filter medium of claim 10, wherein the melt-blown filter layer is electrostatically charged.

16. The filter medium of claim 10, wherein the support layer is a spunbond layer.

* * * * *